(12) United States Patent
Da Silva et al.

(10) Patent No.: US 11,368,204 B2
(45) Date of Patent: *Jun. 21, 2022

(54) APPARATUS, SYSTEM AND METHOD OF BEAM REFINEMENT PROTOCOL (BRP) TRANSMIT (TX) SECTOR SWEEP (SS) (TXSS)

(71) Applicant: INTEL CORPORATION, Santa Clara, CA (US)

(72) Inventors: Claudio Da Silva, Portland, OR (US); Artyom Lomayev, Nizhny Novgorod (RU); Jonathan Kosloff, Tel Aviv (IL); Carlos Cordeiro, Portland, OR (US); Cheng Chen, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/625,745

(22) PCT Filed: Jun. 21, 2018

(86) PCT No.: PCT/US2018/038649
§ 371 (c)(1),
(2) Date: Dec. 22, 2019

(87) PCT Pub. No.: WO2018/237100
PCT Pub. Date: Dec. 27, 2018

(65) Prior Publication Data
US 2021/0067227 A1 Mar. 4, 2021

Related U.S. Application Data

(60) Provisional application No. 62/523,951, filed on Jun. 23, 2017.

(51) Int. Cl.
*H04B 7/06* (2006.01)
*H04B 7/08* (2006.01)

(52) U.S. Cl.
CPC ......... *H04B 7/0695* (2013.01); *H04B 7/0619* (2013.01); *H04B 7/086* (2013.01); *H04B 7/088* (2013.01)

(58) Field of Classification Search
CPC .... H04B 7/0695; H04B 7/0617; H04B 7/088; H04B 7/0413; H04B 7/0417; H04B 7/0452
See application file for complete search history.

(56) References Cited

U.S. PATENT DOCUMENTS

| 8,611,288 B1 | 12/2013 | Zhang et al. |
| 2015/0103756 A1 | 4/2015 | Sinha |

(Continued)

FOREIGN PATENT DOCUMENTS

| EP | 2582068 | 4/2013 |
| WO | 2018118118 | 6/2018 |

OTHER PUBLICATIONS

Huang et al, CR on BRP Frame in Candidate Draft D0.2, IEEE P802.11 Wireless LANs, Panasonic, Feb. 2017 (Year: 2017).*

(Continued)

*Primary Examiner* — Aristocratis Fotakis
(74) *Attorney, Agent, or Firm* — Shichrur & Co.

(57) ABSTRACT

For example, an Enhanced Directional Multi-Gigabit (EDMG) initiator station (STA) of a Beam Refinement Protocol (BRP) Transmit (TX) Sector Sweep (SS) (TXSS) may be configured to, during an initiator BRP TXSS, transmit one or more initiator EDMG BRP-TX packets to an EDMG responder STA; during a responder BRP TXSS following the initiator BRP TXSS, to receive one or more responder EDMG BRP-TX packets from the EDMG (Continued)

responder STA; and to transmit to the EDMG responder STA a BRP frame including feedback based on measurements on the one or more responder EDMG BRP-TX packets.

25 Claims, 9 Drawing Sheets

(56) References Cited

U.S. PATENT DOCUMENTS

| | | |
|---|---|---|
| 2015/0289147 A1 | 10/2015 | Lou et al. |
| 2016/0087695 A1 | 3/2016 | Wang |
| 2016/0323755 A1 | 11/2016 | Cordeiro et al. |
| 2017/0207839 A1* | 7/2017 | Eitan ............... H04W 72/14 |
| 2017/0265224 A1* | 9/2017 | Sanderovich ..... H04W 74/0816 |
| 2017/0317727 A1* | 11/2017 | Wang ............... H04B 7/0617 |
| 2018/0191419 A1* | 7/2018 | Eitan ............... H04B 7/0617 |
| 2018/0198505 A1* | 7/2018 | Eitan ............... H04B 7/0491 |
| 2018/0205423 A1* | 7/2018 | Sanderovich ....... H04B 7/0695 |
| 2018/0234860 A1* | 8/2018 | Kash ............... H04B 7/0632 |
| 2018/0248600 A1* | 8/2018 | Kash ............... H04B 7/0684 |
| 2019/0068258 A1* | 2/2019 | Oteri ............... H04B 7/043 |
| 2019/0081674 A1* | 3/2019 | Oteri ............... H04B 7/061 |
| 2019/0090253 A1* | 3/2019 | Da Silva ........... H04W 72/085 |
| 2019/0140730 A1* | 5/2019 | Oteri ............... H04B 7/0417 |
| 2019/0288760 A1* | 9/2019 | Li ................. H04B 7/0634 |
| 2019/0288763 A1* | 9/2019 | Oteri ............... H04B 7/0697 |
| 2020/0044724 A1* | 2/2020 | Kim ................ H04B 7/063 |
| 2020/0204235 A1* | 6/2020 | Liu ................ H04B 7/088 |
| 2020/0204241 A1* | 6/2020 | Park ............... H04B 7/0417 |
| 2020/0235801 A1 | 7/2020 | Da Silva et al. |
| 2021/0028831 A1* | 1/2021 | Lou ................ H04B 7/0619 |
| 2021/0143887 A1* | 5/2021 | Oteri ............... H04B 7/0628 |

OTHER PUBLICATIONS

Huang et al, "Comment Resolution on MIMO BF Setup", IEEE 802.11-17/0921r1, IEEE P802.11 Wireless LANs, Jun. 21, 2017 (Year: 2017).*
International Search Report and the Written Opinion for International Application No. PCT/US2018/038649, dated Oct. 10, 2018, 13 pages.
Claudio Da Silva et al., 'Draft text for BRP Transmit Sector Sweep', IEEE 802 11-17/0323r2, Mar. 14, 2017, 8 pages.
Assaf Kasher, 'BF comment resolution', IEEE 802.11-17/0922r0, Jun. 21, 2017, 9 pages.
IEEE Std 802.11 ™—2016. IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016, 3534 pages.
International Search Report and the Written Opinion for International Application No. PCT/US2017/039927, dated Oct. 30, 2017, 10 pages.
Kome Oteri et al. Interdigital Inc.,'Further Details on Multi-Stage, Multi-Resolution Beamforming Training in 302.1 lay', IEEE 802.11-16/1447r1, Nov. 7, 2016, 20 pages.
Payam Torab, Broadcom Ltd., 'DMG low-power SC A-PPDU and other MAC fixes', IEEE 802.11-15/1272r01, Mar. 14, 2016, 4 pages.
International Preliminary Report on Patentability for International Application No. PCT/US2017/039927, dated Jul. 4, 2019, 7 pages.
International Preliminary Report on Patentability for International Application No. PCT/US2018/038649, dated Jan. 2, 2020, 10 pages.
Office Action for U.S. Appl. No. 16/839,085 dated Feb. 5, 2021, 36 pages.
Office Action for U.S. Appl. No. 16/839,085, dated Jun. 2, 2021, 36 pages.
Office Action for U.S. Appl. No. 16/839,085 dated Oct. 14, 2020, 39 pages.
Notice of Allowance for U.S. Appl. No. 16/839,085, dated Feb. 16, 2022, 16 pages.

* cited by examiner

APPARATUS, SYSTEM AND METHOD OF BEAM REFINEMENT PROTOCOL (BRP) TRANSMIT (TX) SECTOR SWEEP (SS) (TXSS)

CROSS REFERENCE

This application claims the benefit of and priority from U.S. Provisional Patent Application No. 62/523,951 entitled "Enhanced beamforming training for wireless communication", filed Jun. 23, 2017, the entire disclosure of which is incorporated herein by reference.

TECHNICAL FIELD

Embodiments described herein generally relate to Beam Refinement Protocol (BRP) Transmit Sector Sweep (TXSS).

BACKGROUND

A wireless communication network in a millimeter-wave band may provide high-speed data access for users of wireless communication devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
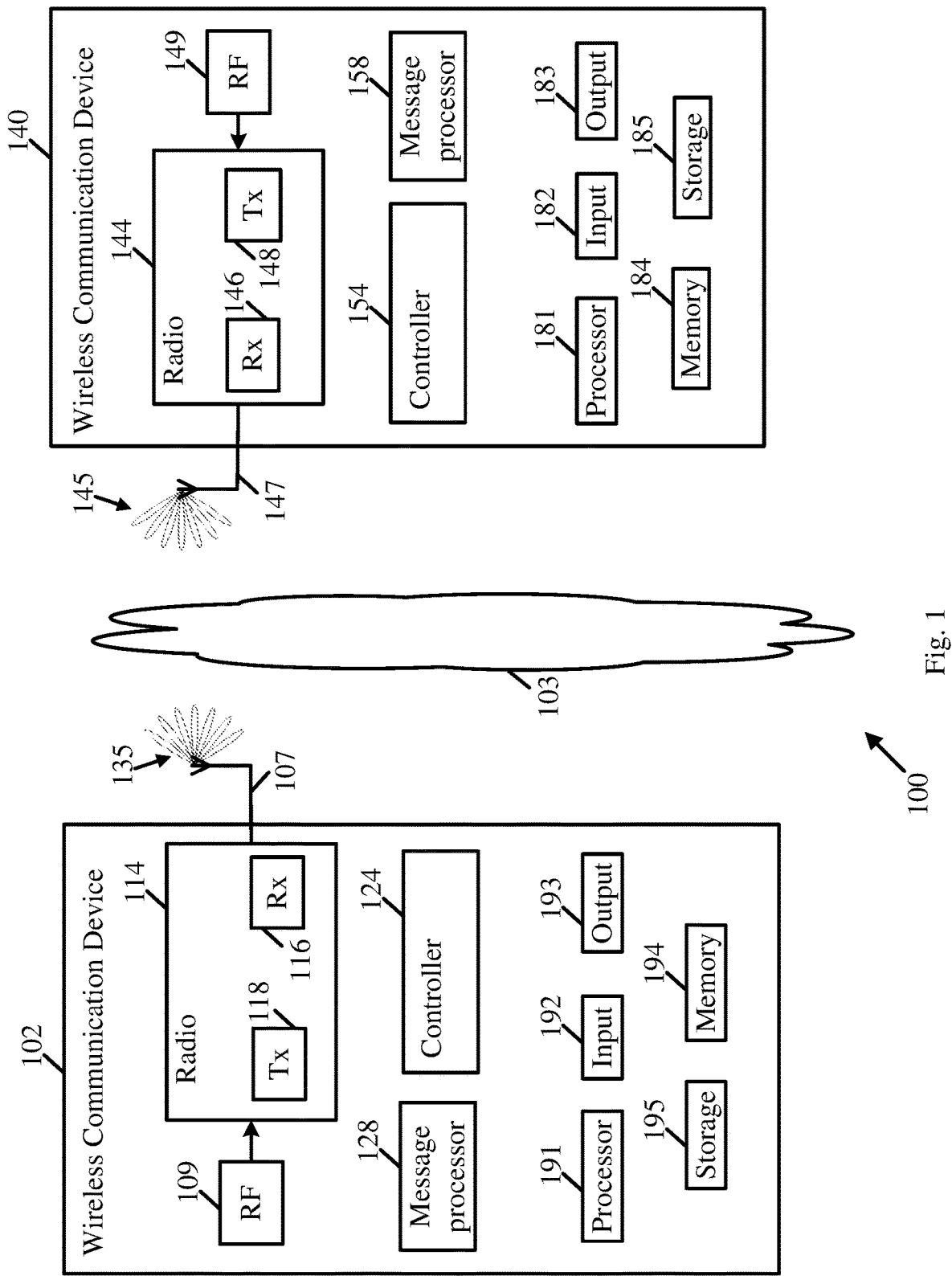
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2016 (IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016); and/or IEEE 802.11ay (P802.11ay/D1.0 Draft Standard for Information Technology—Telecommunications and Information Exchange Between Systems—Local and Metropolitan Area Networks—Specific Requirements Part 11: Wireless LAN Medium Access Control (MAC) and Physical Layer (PHY) Specifications Amendment 7: Enhanced Throughput for Operation in License Exempt Bands Above 45 GHz, November 2017)) and/or future versions and/or derivatives thereof, devices and/or networks operating in accordance with existing WFA Peer-to-Peer (P2P) specifications (WiFi P2P technical specification, version 1.7, Jul. 6, 2016) and/or future versions and/or derivatives thereof, devices and/or networks operating in accordance with existing Wireless-Gigabit-Alliance (WGA) specifications (including Wireless Gigabit Alliance, Inc WiGig MAC and PHY Specification Version 1.1, April 2011, Final specification) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band above 45 Gigahertz (GHz), e.g., 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHz, a frequency band above 45 GHz, a 5G frequency band, a frequency band below 20 GHz, e.g., a Sub 1 GHz (S1G) band, a 2.4 GHz band, a 5 GHz band, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., at least 7 Gigabit per second, at least 30 Gigabit per second, or any other rate.

Some demonstrative embodiments may be implemented by a DMG STA (also referred to as a "mmWave STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a wireless communication device 102, a wireless communication device 140, and/or one more other devices.

In some demonstrative embodiments, devices 102 and/or 140 may include a mobile device or a non-mobile, e.g., a static, device.

For example, devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SDRAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, an RF channel, a WiFi channel, a 5G channel, an IR channel, a Bluetooth (BT) channel, a Global Navigation Satellite System (GNSS) Channel, and the like.

In some demonstrative embodiments, WM 103 may include one or more directional bands and/or channels. For example, WM 103 may include one or more millimeter-wave (mmWave) wireless communication bands and/or channels.

In some demonstrative embodiments, WM 103 may include one or more DMG channels. In other embodiments WM 103 may include any other directional channels.

In other embodiments, WM 103 may include any other type of channel over any other frequency band.

In some demonstrative embodiments, device 102 and/or device 140 may include one or more radios including circuitry and/or logic to perform wireless communication between devices 102, 140 and/or one or more other wireless communication devices. For example, device 102 may include at least one radio 114, and/or device 140 may include at least one radio 144.

In some demonstrative embodiments, radio 114 and/or radio 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radio 114 and/or radio 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a directional band, for example, an mmWave band, a 5G band, and/or any other band, for example, a 2.4 GHz band, a 5 GHz band, a S1G band, and/or any other band.

In some demonstrative embodiments, radios 114 and/or 144 may include, or may be associated with one or more, e.g., a plurality of, directional antennas.

In some demonstrative embodiments, device 102 may include one or more, e.g., a plurality of, directional antennas 107, and/or device 140 may include on or more, e.g., a plurality of, directional antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include directional antennas, which may be steered to one or more beam directions. For example, antennas 107 may be steered to one or more beam directions 135, and/or antennas 147 may be steered to one or more beam directions 145.

In some demonstrative embodiments, antennas 107 and/or 147 may include and/or may be implemented as part of a single Phased Antenna Array (PAA).

In some demonstrative embodiments, antennas 107 and/or 147 may be implemented as part of a plurality of PAAs, for example, as a plurality of physically independent PAAs.

In some demonstrative embodiments, a PAA may include, for example, a rectangular geometry, e.g., including an integer number, denoted M, of rows, and an integer number, denoted N, of columns. In other embodiments, any other types of antennas and/or antenna arrays may be used.

In some demonstrative embodiments, antennas 107 and/or antennas 147 may be connected to, and/or associated with, one or more Radio Frequency (RF) chains.

In some demonstrative embodiments, device 102 may include one or more, e.g., a plurality of, RF chains 109 connected to, and/or associated with, antennas 107.

In some demonstrative embodiments, one or more of RF chains 109 may be included as part of, and/or implemented as part of one or more elements of radio 114, e.g., as part of transmitter 118 and/or receiver 116.

In some demonstrative embodiments, device 140 may include one or more, e.g., a plurality of, RF chains 149 connected to, and/or associated with, antennas 147.

In some demonstrative embodiments, one or more of RF chains 149 may be included as part of, and/or implemented as part of one or more elements of radio 144, e.g., as part of transmitter 148 and/or receiver 146.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative embodiments, controllers 124 and/or 154 may include, or may be implemented, partially or entirely, by circuitry and/or logic, e.g., one or more processors including circuitry and/or logic, memory circuitry and/ or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other embodiments, message processor 128 may be configured to perform any other additional or alternative functionality and/or may include any other additional or alternative components to generate and/or process a message to be transmitted.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processor 158 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other embodiments, message processor 158 may be configured to perform any other additional or alternative functionality and/or may include any other additional or alternative components to generate and/or process a message to be transmitted.

In some demonstrative embodiments, message processors 128 and/or 158 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144.

In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, device 102 and/or device 140 may include, operate as, perform the role of, and/or perform one or more functionalities of, one or more STAs. For example, device 102 may include at least one STA, and/or device 140 may include at least one STA.

In some demonstrative embodiments, device 102 and/or device 140 may include, operate as, perform the role of, and/or perform one or more functionalities of, one or more DMG STAs. For example, device 102 may include, operate as, perform the role of, and/or perform one or more functionalities of, at least one DMG STA, and/or device 140 may include, operate as, perform the role of, and/or perform one or more functionalities of, at least one DMG STA.

In other embodiments, devices 102 and/or 140 may include, operate as, perform the role of, and/or perform one or more functionalities of, any other wireless device and/or station, e.g., a WLAN STA, a WiFi STA, and the like.

In some demonstrative embodiments, device 102 and/or device 140 may be configured operate as, perform the role of, and/or perform one or more functionalities of, an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, device 102 and/or device 140 may be configured to operate as, perform the role of, and/or perform one or more functionalities of, a non-AP STA, e.g., a DMG non-AP STA, and/or a non-PCP STA, e.g., a DMG non-PCP STA, for example, a non-AP/PCP STA, e.g., a DMG non-AP/PCP STA.

In other embodiments, device 102 and/or device 140 may operate as, perform the role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In some demonstrative embodiments devices 102 and/or 140 may be configured to communicate over a Next Generation 60 GHz (NG60) network, an Enhanced DMG (EDMG) network, and/or any other network. For example, devices 102 and/or 140 may perform Multiple-Input-Multiple-Output (MIMO) communication, for example, for communicating over the NG60 and/or EDMG networks, e.g., over an NG60 or an EDMG frequency band.

In some demonstrative embodiments, devices 102 and/or 140 may be configured to operate in accordance with one or more Specifications, for example, including one or more IEEE 802.11 Specifications, e.g., an IEEE 802.11-2016 Specification, an IEEE 802.11ay Specification, and/or any other specification and/or protocol.

Some demonstrative embodiments may be implemented, for example, as part of a new standard in an mmWave band, e.g., a 60 GHz frequency band/or any other directional band, for example, as an evolution of an IEEE 802.11-2016 Specification and/or an IEEE 802.11ad Specification.

In some demonstrative embodiments, devices 102 and/or 140 may be configured according to one or more standards, for example, in accordance with an IEEE 802.11ay Standard, which may be, for example, configured to enhance the efficiency and/or performance of an IEEE 802.11ad Specification, which may be configured to provide Wi-Fi connectivity in a 60 GHz band.

Some demonstrative embodiments may enable, for example, to significantly increase the data transmission rates defined in the IEEE 802.11ad Specification, for example, from 7 Gigabit per second (Gbps), e.g., up to 30 Gbps, or to any other data rate, which may, for example, satisfy growing demand in network capacity for new coming applications.

Some demonstrative embodiments may be implemented, for example, to allow increasing a transmission data rate, for example, by applying MIMO and/or channel bonding techniques.

In some demonstrative embodiments, devices 102 and/or 140 may be configured to communicate MIMO communications over the mmWave wireless communication band.

In some demonstrative embodiments, device 102 and/or device 140 may be configured to support one or more mechanisms and/or features, for example, channel bonding, Single User (SU) MIMO (SU-MIMO), and/or Multi-User (MU) MIMO (MU-MIMO), for example, in accordance with an IEEE 802.11ay Standard and/or any other standard and/or protocol.

In some demonstrative embodiments, device 102 and/or device 140 may include, operate as, perform a role of, and/or perform the functionality of, one or more EDMG STAs. For example, device 102 may include, operate as, perform a role of, and/or perform the functionality of, at least one EDMG STA, and/or device 140 may include, operate as, perform a role of, and/or perform the functionality of, at least one EDMG STA.

In some demonstrative embodiments, devices 102 and/or 140 may implement a communication scheme, which may include Physical layer (PHY) and/or Media Access Control (MAC) layer schemes, for example, to support one or more applications, and/or increased transmission data rates, e.g., data rates of up to 30 Gbps, or any other data rate.

In some demonstrative embodiments, the PHY and/or MAC layer schemes may be configured to support frequency channel bonding over a mmWave band, e.g., over a 60 GHz band, SU MIMO techniques, and/or MU MIMO techniques.

In some demonstrative embodiments, devices 102 and/or 140 may be configured to implement one or more mechanisms, which may be configured to enable SU and/or MU communication of Downlink (DL) and/or Uplink frames (UL) using a MIMO scheme.

In some demonstrative embodiments, device 102 and/or device 140 may be configured to implement one or more MU communication mechanisms. For example, devices 102 and/or 140 may be configured to implement one or more MU mechanisms, which may be configured to enable MU communication of DL frames using a MIMO scheme, for example, between a device, e.g., device 102, and a plurality of devices, e.g., including device 140 and/or one or more other devices.

In some demonstrative embodiments, devices 102 and/or 140 may be configured to communicate over an NG60 network, an EDMG network, and/or any other network and/or any other frequency band. For example, devices 102 and/or 140 may be configured to communicate DL MIMO transmissions and/or UL MIMO transmissions, for example, for communicating over the NG60 and/or EDMG networks.

Some wireless communication Specifications, for example, the IEEE 802.11ad-2012 Specification, may be configured to support a SU system, in which a STA may transmit frames to a single STA at a time. Such Specifications may not be able, for example, to support a STA transmitting to multiple STAs simultaneously, for example, using a MU-MIMO scheme, e.g., a DL MU-MIMO, or any other MU scheme.

In some demonstrative embodiments, devices 102 and/or 140 may be configured to communicate over a channel bandwidth, e.g., of at least 2.16 GHz, in a frequency band above 45 GHz.

In some demonstrative embodiments, devices 102 and/or 140 may be configured to implement one or more mechanisms, which may, for example, enable to extend a single-channel BW scheme, e.g., a scheme in accordance with the IEEE 802.11ad Specification or any other scheme, for higher data rates and/or increased capabilities, e.g., as described below.

In one example, the single-channel BW scheme may include communication over a 2.16 GHz channel (also referred to as a "single-channel" or a "DMG channel").

In some demonstrative embodiments, devices 102 and/or 140 may be configured to implement one or more channel bonding mechanisms, which may, for example, support communication over a channel BW (also referred to as a "wide channel", an "EDMG channel", or a "bonded channel") including two or more channels, e.g., two or more 2.16 GHz channels, e.g., as described below.

In some demonstrative embodiments, the channel bonding mechanisms may include, for example, a mechanism and/or an operation whereby two or more channels, e.g., 2.16 GHz channels, can be combined, e.g., for a higher bandwidth of packet transmission, for example, to enable achieving higher data rates, e.g., when compared to transmissions over a single channel. Some demonstrative embodiments are described herein with respect to communication over a channel BW including two or more 2.16 GHz channels, however other embodiments may be implemented with respect to communications over a channel bandwidth, e.g., a "wide" channel, including or formed by any other number of two or more channels, for example, an aggregated channel including an aggregation of two or more channels.

In some demonstrative embodiments, device 102 and/or device 140 may be configured to implement one or more channel bonding mechanisms, which may, for example, support an increased channel bandwidth, for example, a channel BW of 4.32 GHz, a channel BW of 6.48 GHz, a channel BW of 8.64 GHz, and/or any other additional or alternative channel BW, e.g., as described below.

In some demonstrative embodiments, device 102 and/or device 140 may be configured to implement one or more channel bonding mechanisms, which may, for example, support an increased channel bandwidth, for example, a channel BW of 4.32 GHz, e.g., including two 2.16 Ghz channels according to a channel bonding factor of two, a channel BW of 6.48 GHz, e.g., including three 2.16 Ghz channels according to a channel bonding factor of three, a channel BW of 8.64 GHz, e.g., including four 2.16 Ghz channels according to a channel bonding factor of four, and/or any other additional or alternative channel BW, e.g., including any other number of 2.16 Ghz channels and/or according to any other channel bonding factor.

In some demonstrative embodiments, device 102 and/or device 140 may be configured to communicate one or more transmissions over one or more channel BWs, for example, including a channel BW of 2.16 GHz, a channel BW of 4.32 GHz, a channel BW of 6.48 GHz, a channel BW of 8.64 GHz and/or any other channel BW.

In some demonstrative embodiments, introduction of MIMO may be based, for example, on implementing robust transmission modes and/or enhancing the reliability of data transmission, e.g., rather than the transmission rate, compared to a Single Input Single Output (SISO) case. For example, one or more Space Time Block Coding (STBC) schemes utilizing a space-time channel diversity property may be implemented to achieve one or more enhancements for the MIMO transmission.

In some demonstrative embodiments, devices 102 and/or 140 may be configured to generate, process, transmit and/or receive a Physical Layer (PHY) Protocol Data Unit (PPDU) having a PPDU format (also referred to as "EDMG PPDU format"), which may be configured, for example, for communication between EDMG stations, e.g., as described below.

In some demonstrative embodiments, a PPDU, e.g., an EDMG PPDU, may include at least one non-EDMG fields, e.g., a legacy field, which may be identified, decodable, and/or processed by one or more devices ("non-EDMG devices", or "legacy devices"), which may not support one or more features and/or mechanisms ("non-legacy" mechanisms or "EDMG mechanisms"). For example, the legacy devices may include non-EDMG stations, which may be, for example, configured according to an IEEE 802.11-2016 Standard, and the like. For example, a non-EDMG station may include a DMG station, which is not an EDMG station.

Figure 2:
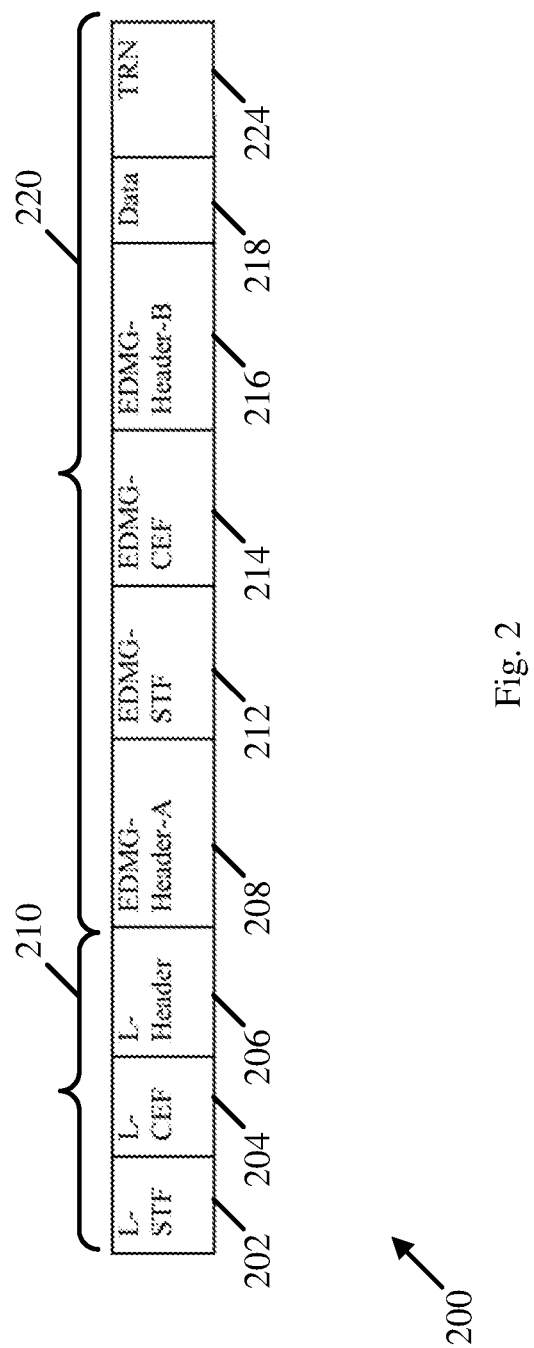
FIG. 2 is a schematic illustration of an Enhanced Directional Multi-Gigabit (EDMG) Physical Layer Protocol Data Unit (PPDU) format, which may be implemented in accordance with some demonstrative embodiments.

Reference is made to FIG. 2, which schematically illustrates an EDMG PPDU format 200, which may be implemented in accordance with some demonstrative embodiments. In one example, devices 102 (FIG. 1) and/or 140 (FIG. 1) may be configured to generate, transmit, receive and/or process one or more EDMG PPDUs having the structure and/or format of EDMG PPDU 200.

In one example, devices 102 (FIG. 1) and/or 140 (FIG. 1) may communicate PPDU 200, for example, as part of a transmission over a channel, e.g., an EDMG channel, having a channel bandwidth including one or more 2.16 GHz channels, for example, including a channel BW of 2.16 GHz, a channel BW of 4.32 GHz, a channel BW of 6.48 GHz, a channel BW of 8.64 GHz, and/or any other channel BW, e.g., as described below.

In some demonstrative embodiments, as shown in FIG. 2, EDMG PPDU 200 may include a non-EDMG portion 210 ("legacy portion"), e.g., as described below.

In some demonstrative embodiments, as shown in FIG. 2, non-EDMG portion 210 may include a non-EDMG (legacy) Short Training Field (STF) (L-STF) 202, a non-EDMG (Legacy) Channel Estimation Field (CEF) (L-CEF) 204, and/or a non-EDMG header (L-header) 206.

In some demonstrative embodiments, as shown in FIG. 2, EDMG PPDU 200, may include an EDMG portion 220, for example, following non-EDMG portion 210, e.g., as described below.

In some demonstrative embodiments, as shown in FIG. 2, EDMG portion 220 may include a first EDMG header, e.g., an EDMG-Header-A 208, an EDMG-STF 212, an EDMG-CEF 214, a second EDMG header, e.g., an EDMG-Header-B 216, a Data field 218, and/or one or more beamforming training fields, e.g., a TRN field 224.

In some demonstrative embodiments, EDMG portion 220 may include some or all of the fields shown in FIG. 2 and/or one or more other additional or alternative fields.

In some demonstrative embodiments, EDMG-Header-B field 216 may be included, for example, in EDMG MU PPDUs, for example, on a per STA basis.

In some demonstrative embodiments, EDMG-Header-B field 216 corresponding to a STA addressed by the EDMG MU PPDU may include, for example, information relating to a transmission of a data unit, for example, a PHY Service Data Unit (PSDU) to the STA.

In some demonstrative embodiments, EDMG Header B field 216 may include for example, 64 bits. In other embodiments, the EDMG Header B field 216 may include any other number of bits.

In one example, EDMG Header B field 216 corresponding to the STA may include, for example, at least a scrambler seed field, a PSDU length field, e.g., to indicate a length of the PSDU to the STA, and/or one or more Modulation and Coding Scheme (MCS) fields to indicate one or more MCSs. For example, the Header B field may include first and second MCS fields to indicate MCSs for first and second respective spatial streams.

In other embodiments, EDMG Header B field 216 may include any other additional or alternative fields and/or information.

Referring back to FIG. 1, in some demonstrative embodiments, devices 102 and/or 140 may be configured to generate, transmit, receive and/or process one or more transmissions of a Beam Refinement Protocol (BRP) Transmit (TX) Sector Sweep (SS) (TXSS), e.g., as described below.

In some demonstrative embodiments, devices 102 and/or 140 may be configured to support a BRP TXSS, for example, as an enhancement, which may be implemented, for example, in accordance with an IEEE 802.11ay Specification.

In some demonstrative embodiments, a distinctive feature of wireless systems operating in a directional frequency band, e.g., frequencies above 45 GHz, is a beamforming mechanism, e.g., a directional transmission and/or reception, which may be implemented, for example, to offset a large free-space path loss of millimeter-wave transmissions.

In some demonstrative embodiments, beamforming training mechanisms may be used by a pair of stations to determine appropriate antenna settings, e.g., for transmission and/or reception.

In some demonstrative embodiments, devices 102 and/or 140 may be configured to support a beamforming training procedure utilizing one or more BRP packets.

For example, as opposed to a "packetized" beamforming training procedure utilizing Sector Sweep (SSW) packets or short SSW packets, a beamforming training utilizing BRP packets may include an "in-packet" training, for example, in which an Antenna Weight Vector (AWV) switching may be performed, for example, during a same, e.g., even a single, packet transmission. The AWV switching may be performed, for example, during a packet postamble transmission, which may include training one or more TRN units of a TRN field.

For example, utilizing the "packetized" beamforming training protocol with a multi antenna STA, e.g., for a Multiple-Input-Multiple-Output (MIMO) transmission, may cause a technical problem, for example, in the form of a significant time overhead.

In some demonstrative embodiments, devices 102 and/or 140 may be configured to perform one or more operations of a beamforming training procedure, which may allow, for example, to at least provide a technical solution of increased efficiency, for example, to significantly reduce the time overhead of the beamforming training.

In some demonstrative embodiments, the beamforming training procedure may be implemented for Single Input Single Output (SISO) beamforming training and/or MIMO beamforming training, for example, with any suitable channel bonding factor, e.g., as described before.

In some demonstrative embodiments, devices 102 and/or 140 may be configured to perform one or more operations in accordance with a beamforming training protocol and/or procedure, which may be configured, for example, to use a TRN structure, for example, a BRP TRN structure, to perform "in-packet" beamforming training, e.g., as described below.

In some demonstrative embodiments, devices 102 and/or 140 may be configured to perform beamforming training, for example, SISO and/or SU-MIMO beamforming training, using a BRP TXSS procedure, which may allow to perform the beamforming training more efficiently, e.g., in significantly less time, for example, compared to a beamforming procedure utilizing SSW packets.

In some demonstrative embodiments, for example, the BRP TXSS procedure may be configured to allow a transmit sector sweep using EDMG BRP-TX packets, e.g., instead of SSW or Short SSW packets.

In some demonstrative embodiments, an enhanced or extended BRP TXSS may be configured to support SU-MIMO beamforming training, e.g., as described below.

In some demonstrative embodiments, a BRP TXSS procedure may be configured to enable transmit sector sweep by both STAs that participate in the procedure, e.g., by including an initiator BRP TXSS to be performed by an initiator STA, and a responder BRP TXSS to be performed by a responder STA, e.g., as described below.

In some demonstrative embodiments, a BRP TXSS procedure may be configured to support transmission of EDMG BRP-TX packets used in a BRP TXSS to be transmitted with multiple transmit chains, e.g., as described below.

In some demonstrative embodiments, a BRP TXSS procedure may be configured to support initiation of the BRP TXSS procedure, for example, even without an exchange of BRP frames with setup information, e.g., as described below. In other embodiments, the exchange of the BRP frames with the setup information may be mandatory.

In some demonstrative embodiments, devices 102 and/or 140 may be configured to support communication of a BRP TXSS, for example, in compliance with an IEEE 802.11ay Specification, which may allow EDMG STAs to perform a transmit sector sweep using EDMG BRP-TX packets, as opposed to "traditional" transmit sector sweep procedures that use SSW or Short SSW packets. One advantage of using EDMG BRP-TX packets is that a number of sectors/AWVs can be trained/used in a single EDMG BRP-TX packet, while a SSW/Short SSW packet may only "train" one sector at a time. As a result, a transmit sector sweep procedure can be performed in significantly less time when EDMG BRP-TX packets are used.

Figure 3:
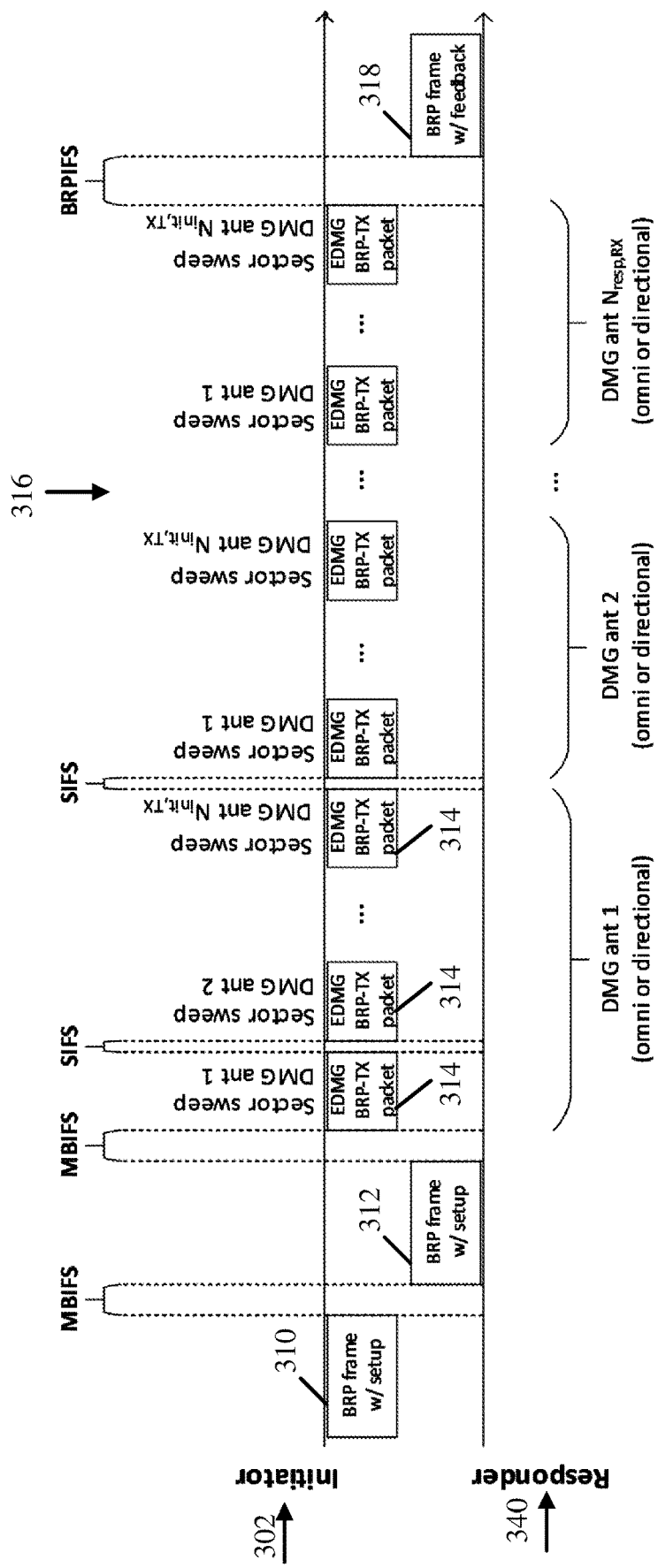
FIG. 3 is a schematic illustration of operations and communications of a Beam Refinement Protocol (BRP) Transmit Sector Sweep (TXSS), which may be implemented in accordance with some demonstrative embodiments.

Reference is made to FIG. 3, which schematically illustrates operations and communications of a BRP TXSS, which may be implemented in accordance with some demonstrative embodiments.

In some demonstrative embodiments, as shown in FIG. 3, the BRP TXSS may be performed between a first EDMG STA ("initiator" or "EDMG initiator STA") 302 and a second EDMG STA ("responder" or "EDMG responder STA") 340.

In some demonstrative embodiments, for example, device 102 (FIG. 1) may be configured to perform one or more functionalities of, one or more operations of, and/or a role of, initiator 302; and/or device 140 (FIG. 1) may be configured to perform one or more functionalities of, one or more operations of, and/or a role of, responder 340.

In some demonstrative embodiments, the BRP TXSS may be implemented by the initiator 302 and responder 340, for example, to test a set of transmit AWVs of the initiator 302, for example, against a quasi-omni receive pattern of the responder 340, for example, for one or more combinations, e.g., all possible combinations, of transmit DMG antenna of the initiator 302 and receive DMG antenna of the responder 340.

In some demonstrative embodiments, as shown in FIG. 3, a BRP TXSS may start (be initiated) with transmission of a BRP frame 310 which indicates the need for transmit sector sweep by the initiator 302.

In some demonstrative embodiments, as shown in FIG. 3, the responder 340 may transmit a BRP frame 312 to initiator 302 to confirm the request to initiate the BRP TXSS.

In some demonstrative embodiments, as shown in FIG. 3, for example, after receiving the confirmation of the BRP TXSS request from the responder 340, the initiator 302 may transmit a plurality of EDMG BRP-TX packets 314 to perform a transmit sector sweep, for example, using one or more of, e.g., each of, the DMG antennas of the initiator 302.

In some demonstrative embodiments, for example, an EDMG BRP-TX packet 314 may include an EDMG PPDU, e.g., according to the format of EDMG PPDU 200 (FIG. 2), including one or more TRN units in a TRN field, e.g., TRN field 224 (FIG. 2).

In some demonstrative embodiments, as shown in FIG. 3, for example, the initiator 302 may repeat the transmission of the EDMG BRP-TX packets 314 for one or more times 316, for example, based on a number of antennas of the responder 340, e.g., for each DMG antenna of the responder 340.

In some demonstrative embodiments, as shown in FIG. 3, for example, the responder 340 may transmit a BRP frame 318 with feedback of the corresponding procedure, for example, based on measurements performed during the reception of one or more of the EDMG BRP-TX packets 314.

In some demonstrative embodiments, the BRP TXSS procedure of FIG. 3 may be adjusted, reconfigured, extended and/or enhanced, for example, by adding, removing, and/or replacing one or more operations and/or communications, e.g., as described below.

In some demonstrative embodiments, for example, one or more operations of the BRP TXSS of FIG. 3 may be enhanced and/or extended, for example, to support SU-MIMO beamforming training, e.g., as described below In some demonstrative embodiments, for example, the BRP TXSS of FIG. 3 may be enhanced and/or extended, for example, to enable transmit sector sweep by both initiator 302 and responder 340, e.g., as described below.

In some demonstrative embodiments, for example, the BRP TXSS of FIG. 3 may be enhanced and/or extended, for example, to enable the EDMG BRP-TX packets used in a BRP TXSS, e.g., BRP TXSS packets 314, to be transmitted with multiple transmit chains, e.g., as described below.

In some demonstrative embodiments, for example, the BRP TXSS of FIG. 3 may be enhanced and/or extended, for example, to enable the BRP TXSS procedure to be initiated, for example, even without an exchange of BRP frames with setup information, e.g., frames 310 and/or 312.

Referring back to FIG. 1, in some demonstrative embodiments, devices 102 and/or 140 may be configured to perform a BRP TXSS including an initiator BRP TXSS, for example, to train the TX antennas of an initiator of the BRP TXSS; and a responder BRP TXSS, e.g., following the initiator BRP TXSS, for example, to train the TX antennas of a responder of the BRP TXSS, e.g., as described below.

In some demonstrative embodiments, controller 124 may be configured to control, cause and/or trigger an EDMG STA implemented by device 102 to perform one or more operations of, one or more functionalities of, and/or a role of, an EDMG initiator STA of a BRP TXSS, for example, between the EDMG initiator STA and an EDMG responder STA, e.g., as described below.

In some demonstrative embodiments, controller 154 may be configured to control, cause and/or trigger an EDMG STA implemented by device 140 to perform one or more operations of, one or more functionalities of, and/or a role of, the EDMG responder STA, e.g., as described below.

In some demonstrative embodiments, controller 124 may be configured to control, cause and/or trigger the EDMG initiator STA implemented by device 102 and/or controller 154 may be configured to control, cause and/or trigger the EDMG responder STA implemented by device 140, to perform an initiator BRP TXSS and a responder BRP TXSS, for example, following the initiator BRP TXSS, e.g., as described below.

In some demonstrative embodiments, controller 124 may be configured to control, cause and/or trigger the EDMG initiator STA implemented by device 102 to, during the initiator BRP TXSS, transmit one or more first EDMG BRP-TX packets (also referred to as "initiator EDMG BRP-TX packets") to the EDMG responder STA, e.g., as described below.

In some demonstrative embodiments, transmission of an initiator EDMG BRP-TX packet of the one or more initiator EDMG BRP-TX packets may include, for example, a SS of at least one antenna of the EDMG initiator STA over a TRN field of the initiator EDMG BRP-TX packet.

In some demonstrative embodiments, controller 124 may be configured to control, cause and/or trigger the EDMG initiator STA implemented by device 102 to repeat transmission of the one or more initiator EDMG BRP-TX packets, for example, based on a count of antennas of the EDMG responder STA, e.g., as described below.

In some demonstrative embodiments, controller 124 may be configured to control, cause and/or trigger the EDMG initiator STA implemented by device 102 to repeat transmission of the one or more initiator EDMG BRP-TX packets, for example, for a number of times equal to the number of antennas of the EDMG responder STA, e.g., as described below.

In some demonstrative embodiments, controller 124 may be configured to control, cause and/or trigger the EDMG initiator STA implemented by device 102 to repeat transmission of the one or more initiator EDMG BRP-TX packets, for example, for a number of times which is less than the number of antennas of the EDMG responder STA, e.g., as described below.

In some demonstrative embodiments, controller 124 may be configured to control, cause and/or trigger the EDMG initiator STA implemented by device 102 to perform a single transmission of the one or more initiator EDMG BRP-TX packets, for example, even when the number of antennas of the EDMG responder STA is greater than one, e.g., as described below.

In some demonstrative embodiments, controller 124 may be configured to control, cause and/or trigger the EDMG initiator STA implemented by device 102 to, during the responder BRP TXSS, e.g., following the initiator BRP TXSS, receive one or more second EDMG BRP-TX packets (also referred to as "responder EDMG BRP-TX packets") from the EDMG responder STA, e.g., as described below.

In some demonstrative embodiments, controller 124 may be configured to control, cause and/or trigger the EDMG initiator STA implemented by device 102 to begin the responder BRP TXSS a Medium Beamforming Inter-Frame Space (IFS) (MBIFS) after the initiator BRP TXSS, e.g., as described below. In other embodiments, the responder BRP TXSS may be separated by any other period and/or IFS from the initiator BRP TXSS.

In some demonstrative embodiments, controller 124 may be configured to control, cause and/or trigger the EDMG initiator STA implemented by device 102 to transmit to the EDMG responder STA a BRP frame including feedback based on measurements on the one or more responder EDMG BRP-TX packets, e.g., as described below.

In some demonstrative embodiments, controller 124 may be configured to control, cause and/or trigger the EDMG initiator STA implemented by device 102 to transmit to the EDMG responder STA an indication that the BRP TXSS is to include the responder BRP TXSS, e.g., as described below.

In some demonstrative embodiments, controller 124 may be configured to control, cause and/or trigger the EDMG initiator STA implemented by device 102 to transmit to the EDMG responder STA a setup BRP frame including an EDMG BRP request element to initiate the BRP TXSS, e.g., as described below.

In some demonstrative embodiments, a field in the EDMG BRP request element may indicate that the BRP TXSS is to include the responder BRP TXSS, e.g., as described below.

In some demonstrative embodiments, for example, an explicit and/or dedicated field may be utilized to indicate that the BRP TXSS is to include the responder BRP TXSS, e.g., as described below.

In some demonstrative embodiments, the responder BRP TXSS may be implicitly indicated by a frame and/or by one or more fields of a frame, e.g., as described below.

In other embodiments, any other field and/or frame and/or any other implicit or explicit indication may be utilized to indicate that the BRP TXSS is to include the responder BRP TXSS.

In some demonstrative embodiments, for example, the responder BRP TXSS may be defined as mandatory, for example, for one or more first types and/or configurations of a BRP TXSS.

In some demonstrative embodiments, for example, the responder BRP TXSS may be defined as optional, for example, for one or more second types and/or configurations of a BRP TXSS.

In some demonstrative embodiments, controller 124 may be configured to control, cause and/or trigger the EDMG initiator STA implemented by device 102 to transmit the BRP frame including the feedback using a same antenna configuration as an antenna configuration for transmission of the setup BRP frame including the EDMG BRP request element to initiate the BRP TXSS, e.g., as described below.

In some demonstrative embodiments, controller 124 may be configured to control, cause and/or trigger the EDMG initiator STA implemented by device 102 to receive from the EDMG responder STA a responder BRP frame including feedback based on measurements on the one or more initiator EDMG BRP-TX packets, e.g., as described below.

In one example, controller 124 may be configured to control, cause and/or trigger the EDMG initiator STA implemented by device 102 to determine one or more TX beamforming settings of a beamformed link to transmit to the EDMG responder STA, for example, based on the feedback from the EDMG responder STA.

In some demonstrative embodiments, controller 124 may be configured to control, cause and/or trigger the EDMG initiator STA implemented by device 102 to perform the BRP TXSS as a SISO BRP TXSS, e.g., as described below.

In some demonstrative embodiments, controller 124 may be configured to control, cause and/or trigger the EDMG initiator STA implemented by device 102 to perform the BRP TXSS as a MIMO BRP TXSS, e.g., as described below.

In some demonstrative embodiments, controller 124 may be configured to control, cause and/or trigger the EDMG initiator STA implemented by device 102 to transmit to the EDMG responder STA the setup BRP frame including the EDMG BRP request element to initiate the BRP TXSS, and may set the EDMG BRP request element to include a field (also referred to as "a TXSS MIMO (TXSS-MIMO) field"), including a value to indicate whether the BRP TXSS is a SISO BRP TXSS or a MIMO BRP TXSS, e.g., as described below.

In other embodiments, any other type of frame or field may be implemented to indicate, explicitly or implicitly, whether the BRP TXSS is a SISO BRP TXSS or a MIMO BRP TXSS.

In some demonstrative embodiments, controller 124 may be configured to control, cause and/or trigger the EDMG initiator STA implemented by device 102 to set the TXSS-MIMO field to a first predefined value, e.g., a value of zero ("0") or any other predefined value, to indicate that the BRP TXSS is the SISO BRP TXSS, for example, in which the EDMG initiator STA is to transmit the one or more initiator EDMG BRP-TX packets using a single transmit chain, and/or the EDMG responder STA is to transmit the one or more responder EDMG BRP-TX packets using a single transmit chain, e.g., as described below.

In some demonstrative embodiments, controller 124 may be configured to control, cause and/or trigger the EDMG initiator STA implemented by device 102 to set the TXSS-MIMO field to a second predefined value, e.g., a value of one ("1") or any other predefined value, to indicate that the BRP TXSS is the MIMO BRP TXSS, for example, in which the EDMG initiator STA is to transmit the one or more initiator EDMG BRP-TX packets using multiple transmit chains, and/or the EDMG responder STA is to transmit the one or more responder EDMG BRP-TX packets using multiple transmit chains, e.g., as described below.

In some demonstrative embodiments, controller 124 may be configured to control, cause and/or trigger the EDMG initiator STA implemented by device 102 to include in the TRN field of the initiator EDMG BRP-TX packet a plurality of orthogonal waveforms.

In some demonstrative embodiments, for example, a count of the plurality of orthogonal waveforms may be based on a count of a plurality of transmit chains to be used by the EDMG initiator STA to transmit the initiator EDMG BRP-TX packet.

For example, the number of orthogonal waveforms in the TRN field of the initiator EDMG BRP-TX packet may be equal to a number of transmit chains to be used by the EDMG initiator STA to transmit the initiator EDMG BRP-TX packet.

In one example, using the plurality of orthogonal waveforms may support beamforming training of the plurality of transmit chains based on the initiator EDMG BRP-TX packet, e.g., simultaneously.

In some demonstrative embodiments, controller 124 may be configured to control, cause and/or trigger the EDMG initiator STA implemented by device 102 to set for the one or more initiator EDMG BRP-TX packets a value of a TXVECTOR parameter, e.g., an EDMG TRN length (EDMG_TRN_LEN) parameter, to a value k, wherein k denotes a count of TRN units to be used in transmit training, e.g., as described below.

In some demonstrative embodiments, controller 124 may be configured to control, cause and/or trigger the EDMG initiator STA implemented by device 102 to set to a predefined value, e.g., a value of one ("1"), a TRN-Unit Receive (RX) pattern field in an EDMG Header A, e.g., EDMG Header A 208 (FIG. 2), of the initiator EDMG BRP-TX packet, e.g., as described below.

In some demonstrative embodiments, controller 124 may be configured to control, cause and/or trigger the EDMG initiator STA implemented by device 102 to communicate transmissions of the BRP TXSS, e.g., to transmit the one or more initiator EDMG BRP-TX packets, over a channel bandwidth in a frequency band above 45 GHz. In other embodiments, any other suitable frequency band may be used.

In some demonstrative embodiments, controller 124 may be configured to control, cause and/or trigger the EDMG initiator STA implemented by device 102 to communicate transmissions of the BRP TXSS, e.g., to transmit the one or more initiator EDMG BRP-TX packets, over a channel bandwidth of 4.32 GHz, 6.48 GHz, or 8.64 GHz. In other embodiments, any other channel BW may be used.

In some demonstrative embodiments, controller 154 may be configured to control, cause and/or trigger the EDMG responder STA implemented by device 140 to, during the initiator BRP TXSS, receive one or more of the initiator EDMG BRP-TX packets from the EDMG initiator STA, e.g., as described below.

In some demonstrative embodiments, controller 154 may be configured to control, cause and/or trigger the EDMG responder STA implemented by device 140 to, during the responder BRP TXSS, e.g., following the initiator BRP TXSS, transmit one or more responder EDMG BRP-TX packets to the EDMG initiator STA, e.g., as described below.

In some demonstrative embodiments, transmission of a responder EDMG BRP-TX packet of the one or more responder EDMG BRP-TX packets may include, for example, a SS of at least one antenna of the EDMG responder STA over a TRN field of the responder EDMG BRP-TX packet.

In some demonstrative embodiments, controller 154 may be configured to control, cause and/or trigger the EDMG responder STA implemented by device 140 to repeat transmission of the one or more responder EDMG BRP-TX packets, for example, based on a count of antennas of the EDMG initiator STA, e.g., as described below.

In some demonstrative embodiments, controller 154 may be configured to control, cause and/or trigger the EDMG responder STA implemented by device 140 to repeat transmission of the one or more responder EDMG BRP-TX packets, for example, for a number of times equal to the number of antennas of the EDMG initiator STA, e.g., as described below.

In some demonstrative embodiments, controller 154 may be configured to control, cause and/or trigger the EDMG responder STA implemented by device 140 to repeat transmission of the one or more responder EDMG BRP-TX packets, for example, for a number of times which is less than the number of antennas of the EDMG initiator STA, e.g., as described below.

In some demonstrative embodiments, controller 154 may be configured to control, cause and/or trigger the EDMG responder STA implemented by device 140 to perform a single transmission of the one or more responder EDMG BRP-TX packets, for example, even when the number of antennas of the EDMG initiator STA is greater than one, e.g., as described below.

In some demonstrative embodiments, controller 154 may be configured to control, cause and/or trigger the EDMG responder STA implemented by device 140 to begin the responder BRP TXSS an MBIFS after the initiator BRP TXSS, e.g., as described below. In other embodiments, the responder BRP TXSS may be separated by any other period and/or IFS from the initiator BRP TXSS.

In some demonstrative embodiments, controller 154 may be configured to control, cause and/or trigger the EDMG responder STA implemented by device 140 to receive from the EDMG initiator STA the BRP frame including the feedback based on measurements on the one or more responder EDMG BRP-TX packets, e.g., as described below.

In one example, controller 154 may be configured to control, cause and/or trigger the EDMG responder STA implemented by device 140 to determine one or more TX beamforming settings of a beamformed link to transmit to the EDMG initiator STA, for example, based on the feedback from the EDMG initiator STA.

In some demonstrative embodiments, controller 154 may be configured to control, cause and/or trigger the EDMG responder STA implemented by device 140 to determine that the BRP TXSS is to include the responder BRP TXSS, for example, based on a frame from the EDMG initiator STA, e.g., as described below.

In some demonstrative embodiments, controller 154 may be configured to control, cause and/or trigger the EDMG responder STA implemented by device 140 to receive from the EDMG responder STA the setup BRP frame including the EDMG BRP request element to initiate the BRP TXSS, e.g., as described below.

In some demonstrative embodiments, controller 154 may be configured to control, cause and/or trigger the EDMG responder STA implemented by device 140 to determine based on a field in the EDMG BRP request element that the BRP TXSS is to include the responder BRP TXSS, e.g., as described below.

In some demonstrative embodiments, controller 154 may be configured to control, cause and/or trigger the EDMG responder STA implemented by device 140 to transmit to the EDMG initiator STA a BRP frame ("responder BRP frame") including feedback based on measurements on the one or more initiator EDMG BRP-TX packets, e.g., as described below.

In some demonstrative embodiments, controller 154 may be configured to control, cause and/or trigger the EDMG responder STA implemented by device 140 to transmit the responder BRP frame including the feedback using a same antenna configuration as an antenna configuration for transmission of a setup BRP frame to the EDMG initiator STA, e.g., as described below.

In some demonstrative embodiments, controller 154 may be configured to control, cause and/or trigger the EDMG responder STA implemented by device 140 to perform the BRP TXSS as a SISO BRP TXSS, e.g., as described below.

In some demonstrative embodiments, controller 154 may be configured to control, cause and/or trigger the EDMG responder STA implemented by device 140 to perform the BRP TXSS as a MIMO BRP TXSS, e.g., as described below.

In some demonstrative embodiments, controller 154 may be configured to control, cause and/or trigger the EDMG responder STA implemented by device 140 to receive the setup BRP frame from the EDMG initiator STA including the EDMG BRP request element to initiate the BRP TXSS, and may determine whether the BRP TXSS is to be a SISO BRP TXSS or a MIMO TXSS, for example, based on the TXSS-MIMO field, e.g., as described below.

In some demonstrative embodiments, controller 154 may be configured to control, cause and/or trigger the EDMG responder STA implemented by device 140 to, when the TXSS-MIMO field includes the first predefined value, e.g., the value of zero, determine that the BRP TXSS is the SISO BRP TXSS in which the EDMG responder STA is to transmit the one or more responder EDMG BRP-TX packets using a single transmit chain, and/or the EDMG initiator STA is to transmit the one or more initiator EDMG BRP-TX packets using a single transmit chain, e.g., as described below.

In some demonstrative embodiments, controller 154 may be configured to control, cause and/or trigger the EDMG responder STA implemented by device 140 to, when the TXSS-MIMO field includes the second predefined value, e.g., the value of one, determine that the BRP TXSS is the MIMO BRP TXSS in which the EDMG responder STA is to transmit the one or more responder EDMG BRP-TX packets using multiple transmit chains, and/or the EDMG initiator STA is to transmit the one or more initiator EDMG BRP-TX packets using multiple transmit chains, e.g., as described below.

In some demonstrative embodiments, controller 154 may be configured to control, cause and/or trigger the EDMG responder STA implemented by device 140 to include in the TRN field of the responder EDMG BRP-TX packet a plurality of orthogonal waveforms.

In some demonstrative embodiments, for example, a count of the plurality of orthogonal waveforms may be based on a count of a plurality of transmit chains to be used by the EDMG responder STA to transmit the responder EDMG BRP-TX packet.

For example, the number of orthogonal waveforms in the TRN field of the responder EDMG BRP-TX packet may be equal to a number of transmit chains to be used by the EDMG responder STA to transmit the responder EDMG BRP-TX packet.

In one example, using the plurality of orthogonal waveforms may support beamforming training of the plurality of transmit chains based on the responder EDMG BRP-TX packet, e.g., simultaneously.

In some demonstrative embodiments, controller 154 may be configured to control, cause and/or trigger the EDMG responder STA implemented by device 140 to set for the one or more responder EDMG BRP-TX packets a value of a TXVECTOR parameter, e.g., an EDMG_TRN_LEN parameter, to a value k, wherein k denotes a count of TRN units to be used in transmit training, e.g., as described below.

In some demonstrative embodiments, controller 154 may be configured to control, cause and/or trigger the EDMG responder STA implemented by device 140 to set to a predefined value, e.g., a value of one ("1"), a TRN-Unit RX pattern field in an EDMG Header A, e.g., EDMG Header A 208 (FIG. 2), of the responder EDMG BRP-TX packet, e.g., as described below.

In some demonstrative embodiments, controller 154 may be configured to control, cause and/or trigger the EDMG responder STA implemented by device 140 to communicate transmissions of the BRP TXSS, e.g., to transmit the one or more responder EDMG BRP-TX packets, over a channel bandwidth in a frequency band above 45 GHz. In other embodiments, any other suitable frequency band may be used.

In some demonstrative embodiments, controller 154 may be configured to control, cause and/or trigger the EDMG responder STA implemented by device 140 to communicate transmissions of the BRP TXSS, e.g., to transmit the one or more responder EDMG BRP-TX packets, over a channel bandwidth of 4.32 GHz, 6.48 GHz, or 8.64 GHz. In other embodiments, any other channel BW may be used.

In some demonstrative embodiments, a field, e.g., a new and/or dedicated field may be implemented, for example, to support indication of the responder BRP TXSS, e.g., as described below. In other embodiments, any other frame and/or field may be implemented to indicate, explicitly or implicitly, that the responder STA is to perform a responder transmit sector sweep in the BRP TXSS procedure.

In some demonstrative embodiments, a dedicated and/or new field may be included in one or more BRP frames, for example, in the EDMG BRP Request element of the BRP frame that initiates a BRP TXSS procedure.

In some demonstrative embodiments, for example, a TXSS-RESPONDER field, or any other field, may be used to indicate that the BRP TXSS is to include the responder BRP TXSS.

In some demonstrative embodiments, for example, when the TXSS-RESPONDER field in EDMG BRP Request element of the BRP frame that initiates a BRP TXSS procedure is set to a predefine value, e.g., a value of one ("1") or any other value, the initiator is to perform an initiator BRP TXSS, and the responder may perform a responder BRP TXSS.

In some demonstrative embodiments, for example, the initiator may send a BRP frame to initiate a BRP TXSS. For example, the BRP frame may include the TXSS-REQUEST subfield in the EDMG BRP Request element set to 1 and a TXSS-SECTORS subfield set to indicate a total number of transmit sectors the initiator is to use in the procedure, e.g., combined over all of the initiator DMG antennas In some demonstrative embodiments, for example, during the initiator BRP TXSS, the initiator may transmit EDMG BRP-TX packets to perform a transmit sector sweep, for example, using each of its DMG antennas. For example, this process may be repeated based on the number of antennas of the responder, e.g., for each DMG antenna of the responder.

In some demonstrative embodiments, the responder may perform the responder BRP TXSS, for example, after receiving the last EDMG BRP-TX packet sent by the initiator. For example, during the responder BRP TXSS, the responder may transmit EDMG BRP-TX packets to perform a transmit sector sweep, for example, using each of its DMG antennas. For example, this process may be repeated based on the number of antennas of the initiator, e.g., for each DMG antenna of the initiator.

In some demonstrative embodiments, the initiator may transmit a BRP frame that contains feedback, for example, after receiving the last EDMG BRP-TX packet sent by the responder. In other embodiments, the feedback may be sent at any other time and/or stage. The feedback may be based, for example, on measurements the initiator performed during the reception of EDMG BRP-TX packets sent by the responder.

In some demonstrative embodiments, the responder may transmit a BRP frame that contains feedback, for example, based on measurements the responder performed during the reception of EDMG BRP-TX packets sent by the initiator.

Figure 4:
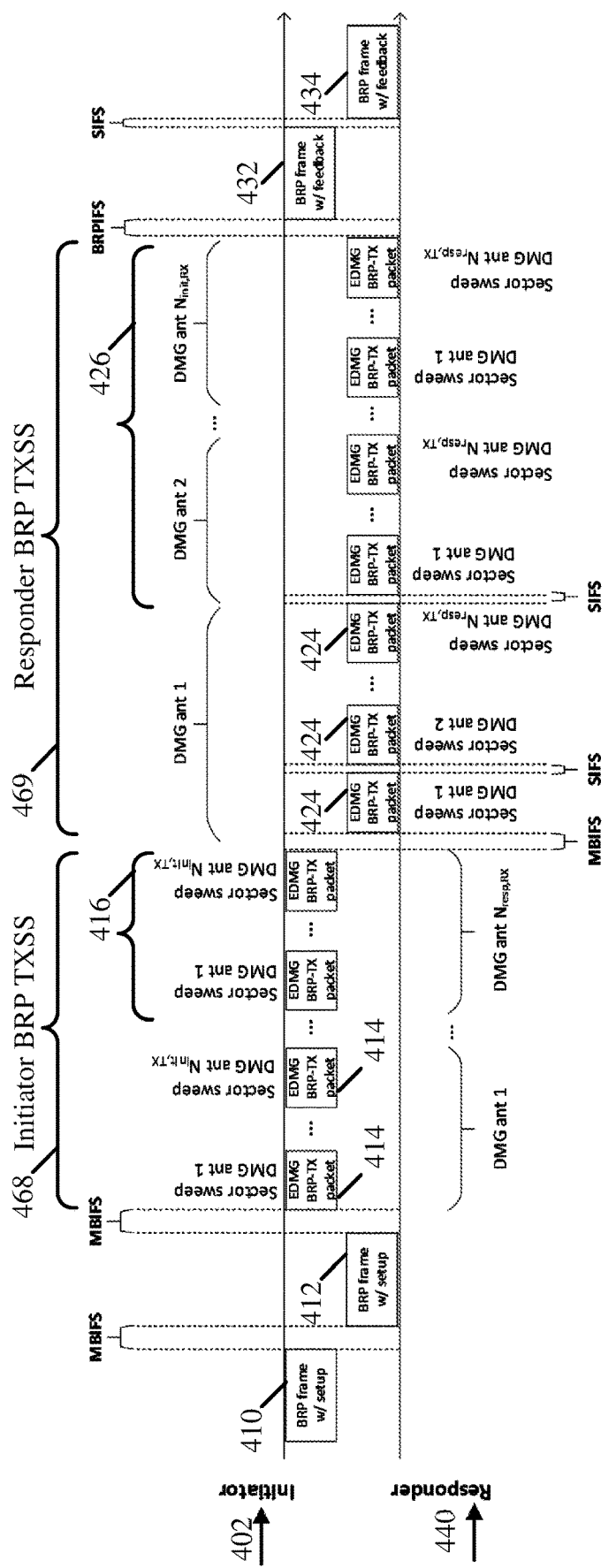
FIG. 4 is a schematic illustration of communications and operations of a BRP TXSS including an initiator BRP TXSS and a responder BRP TXSS, in accordance with some demonstrative embodiments.

Reference is made to FIG. 4, which schematically illustrates operations and communications of a BRP TXSS, in accordance with some demonstrative embodiments.

In some demonstrative embodiments, as shown in FIG. 4, the BRP TXSS may be performed between a first EDMG STA ("initiator" or "EDMG initiator STA") 402 and a second EDMG STA ("responder" or "EDMG responder STA") 440.

In some demonstrative embodiments, for example, device 102 (FIG. 1) may be configured to perform one or more functionalities of, one or more operations of, and/or a role of, initiator 402; and/or device 140 (FIG. 1) may be configured to perform one or more functionalities of, one or more operations of, and/or a role of, responder 440.

In some demonstrative embodiments, the BRP TXSS may include an initiator BRP TXSS 468, which may be implemented by the initiator 402 and responder 440, for example, to test a set of transmit AWVs of the initiator 402, for example, against a quasi-omni receive pattern of the responder 440, for example, for one or more combinations, e.g., all possible combinations, of transmit DMG antenna of the initiator 402 and receive DMG antenna of the responder 440.

In some demonstrative embodiments, the BRP TXSS may include a responder BRP TXSS 469, which may be implemented by the initiator 402 and responder 440, for example, to test a set of transmit AWVs of the responder 440, for example, against a quasi-omni receive pattern of the initiator 402, for example, for one or more combinations, e.g., all possible combinations, of transmit DMG antenna of the responder 440 and receive DMG antenna of the initiator 402.

In some demonstrative embodiments, as shown in FIG. 4, the BRP TXSS may start (be initiated) with transmission of a BRP frame 410, which indicates the need for transmit sector sweep by the initiator 402, e.g., during initiator BRP TXSS 468.

In some demonstrative embodiments, the BRP frame 410 may be configured to indicate a transmit sector sweep to be performed by the responder 440, e.g., during responder BRP TXSS 469.

In one example, at least one field in BRP frame 410 may indicate that the BRP TXSS is to include responder BRP TXSS 469, e.g., as described above. In another example, responder BRP TXSS 469 may be defined to be mandatory for the BRP TXSS, e.g., as described above.

In some demonstrative embodiments, as shown in FIG. 4, the responder 440 may transmit a BRP frame 412 to initiator 402 to confirm the request to initiate the BRP TXSS.

In some demonstrative embodiments, as shown in FIG. 4, during the initiator BRP TXSS 468, the initiator 402 may transmit one or more EDMG BRP-TX packets 414 to the responder 440.

For example, transmission of an EDMG BRP-TX packet 414 may include a SS of at least one antenna of the initiator 402 over a TRN field of the EDMG BRP-TX packet 414.

For example, as shown in FIG. 4, the initiator 402 may transmit a first EDMG BRP-TX packet 414 via a sector sweep of a first DMG antenna (DMG ant 1) of the initiator 402, a second EDMG BRP-TX packet 414 via a sector sweep of a second DMG antenna (DMG ant 2) of the initiator 402, and so on, e.g., until an $N_{int,TX}$-th EDMG BRP-TX packet 414 via a sector sweep of an $N_{int,TX}$-th DMG antenna (DMG ant $N_{int,TX}$-th) of the initiator 402. In other embodiments, any other number of EDMG BRP-TX packets 414 may be transmitted according to any other antenna configuration.

In some demonstrative embodiments, for example, as shown in FIG. 4, the responder 440 may operate an antenna of the responder (DMG ant 1), e.g., at a quasi-omnidirectional mode, to receive one or more of the EDMG BRP-TX packets 414.

In some demonstrative embodiments, for example, as shown in FIG. 4, the initiator 402 may repeat the transmission of the EDMG BRP-TX packets 414 for one or more times 416, for example, based on a number, denoted $N_{resp,RX}$, of receive antennas of the responder 440.

In some demonstrative embodiments, as shown in FIG. 4, during the responder BRP TXSS 469, the responder 440 may transmit one or more EDMG BRP-TX packets 424 to the initiator 402.

For example, transmission of an EDMG BRP-TX packet 424 may include a SS of at least one antenna of the responder 440 over a TRN field of the EDMG BRP-TX packet 424.

For example, as shown in FIG. 4, the responder 440 may transmit a first EDMG BRP-TX packet 424 via a sector sweep of a first DMG antenna (DMG ant 1) of the responder 440, a second EDMG BRP-TX packet 424 via a sector sweep of a second DMG antenna (DMG ant 2) of the responder 440, and so on, e.g., until an $N_{resp,TX}$-th EDMG BRP-TX packet 424 via a sector sweep of an $N_{resp,TX}$-th DMG antenna (DMG ant $N_{resp,TX}$-th) of the responder 440. In other embodiments, any other number of EDMG BRP-TX packets 424 may be transmitted according to any other antenna configuration.

In some demonstrative embodiments, for example, as shown in FIG. 4, the initiator 402 may operate an antenna of the initiator (DMG ant 1), e.g., at a quasi-omnidirectional mode, to receive one or more of the EDMG BRP-TX packets 424.

In some demonstrative embodiments, for example, as shown in FIG. 4, the responder 440 may repeat the transmission of the EDMG BRP-TX packets 424 for one or more times 426, for example, based on a number, denoted $N_{init,Rx}$, of receive antennas of the initiator 402.

In some demonstrative embodiments, as shown in FIG. 4, the initiator 402 may transmit a BRP frame 432 including feedback, for example, based on measurements made by the initiator 402 on the EDMG BRP-TX packets 424 from the responder 440.

In some demonstrative embodiments, as shown in FIG. 4, the responder 440 may transmit a BRP frame 434 including feedback, for example, based on measurements made by the responder 440 on the EDMG BRP-TX packets 414 from the initiator 402.

Referring back to FIG. 1, in some demonstrative embodiments, devices 102 and/or 140 may be configured to support transmission of EDMG BRP-TX packets during a BRP TXSS procedure with multiple chains, e.g., as a MIMO transmission.

In some demonstrative embodiments, a field, e.g., a new field, a dedicated field, or an existing field, may be configured to indicate that the BRP TXSS is to be a MIMO BRP TXSS.

In some demonstrative embodiments, for example, a new field, e.g., a TXSS-MIMO field or any other field, may be included in the EDMG BRP Request element of the BRP frame that initiates a BRP TXSS procedure.

In some demonstrative embodiments, the TXSS-MIMO field may be set to a predefined value, e.g., one ("1") or any other value, to indicate that one or more EDMG BRP-TX packets are to be transmitted in the sector sweep of a station and, that a TRN field of a EDMG BRP-TX packet may include, e.g., may consist of, N orthogonal waveforms, where N is the number of transmit chains used in the transmission of the EDMG BRP-TX packet.

In some demonstrative embodiments, in a MIMO BRP TXSS, channel measurements shall be obtained during the reception of a single EDMG BRP-TX packet.

In some demonstrative embodiments, for example, a STA that is part of a MIMO BRP TXSS and receives EDMG BRP-TX packets, shall perform channel measurements using all of its DMG antennas, e.g., simultaneously, and provide feedback for one or more, e.g., for each, of its DMG antennas.

Figure 5:
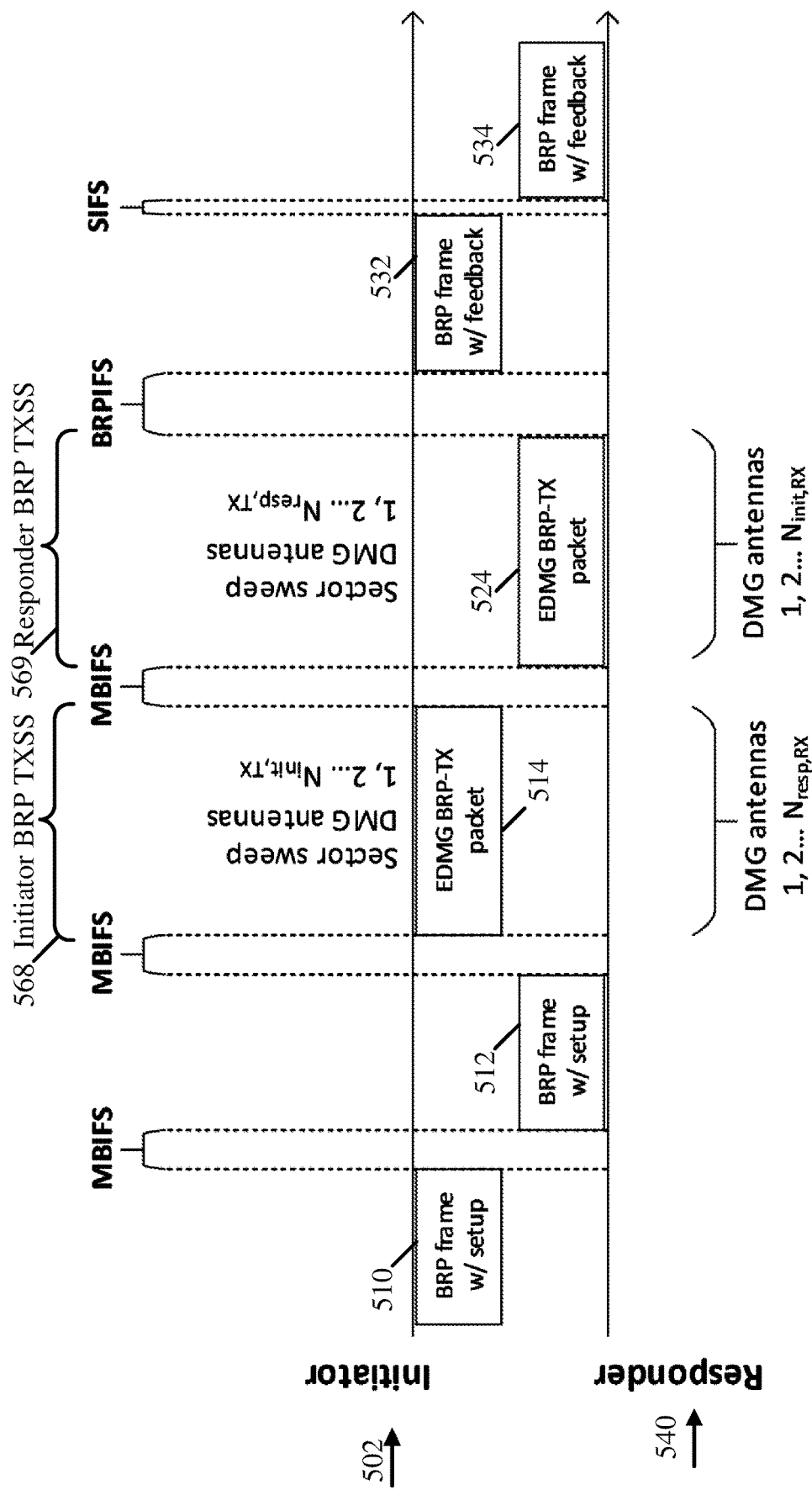
FIG. 5 is a schematic illustration of communications and operations of a Multiple-Input-Multiple-Output (MIMO) BRP TXSS, in accordance with some demonstrative embodiments.

Reference is made to FIG. 5, which schematically illustrates operations and communications of a MIMO BRP TXSS, in accordance with some demonstrative embodiments.

In some demonstrative embodiments, as shown in FIG. 5, the MIMO BRP TXSS may be performed between a first EDMG STA ("initiator" or "EDMG initiator STA") 502 and a second EDMG STA ("responder" or "EDMG responder STA") 540.

In some demonstrative embodiments, for example, device 102 (FIG. 1) may be configured to perform one or more functionalities of, one or more operations of, and/or a role of, initiator 502; and/or device 140 (FIG. 1) may be configured to perform one or more functionalities of, one or more operations of, and/or a role of, responder 540.

In some demonstrative embodiments, the MIMO BRP TXSS may include an initiator BRP TXSS 568, which may be implemented by the initiator 502 and responder 540, for example, to test a set of transmit AWVs of the initiator 502, for example, against a quasi-omni receive pattern of the responder 540, for example, for one or more combinations, e.g., all possible combinations, of transmit DMG antenna of the initiator 502 and receive DMG antenna of the responder 540.

In some demonstrative embodiments, the BRP TXSS may include a responder BRP TXSS 569, which may be implemented by the initiator 502 and responder 540, for example, to test a set of transmit AWVs of the responder 540, for example, against a quasi-omni receive pattern of the initiator 502, for example, for one or more combinations, e.g., all possible combinations, of transmit DMG antenna of the responder 540 and receive DMG antenna of the initiator 502.

In some demonstrative embodiments, as shown in FIG. 5, the MIMO BRP TXSS may start (be initiated) with transmission of a BRP frame 510, which indicates the need for transmit MIMO sector sweep by the initiator 502, e.g., during initiator BRP TXSS 568.

In some demonstrative embodiments, the BRP frame 510 may be configured to indicate a MIMO transmit sector sweep to be performed by the responder 540, e.g., during responder BRP TXSS 569.

In one example, at least one field in BRP frame 510 may indicate that the MIMO BRP TXSS is to include responder BRP TXSS 569, e.g., as described above. In another example, responder BRP TXSS 569 may be defined to be mandatory for the MIMO BRP TXSS, e.g., as described above.

In some demonstrative embodiments, BRP frame 510 may include the TXSS-MIMO field set to the value, e.g., the value one, to indicate the MIMO BRP TXSS is to be performed. In other embodiments, any other field or frame may be used to indicate the MIMO BRP TXSS.

In some demonstrative embodiments, as shown in FIG. 5, the responder 540 may transmit a BRP frame 512 to initiator 502 to confirm the request to initiate the MIMO BRP TXSS.

In some demonstrative embodiments, as shown in FIG. 5, during the initiator BRP TXSS 568, the initiator 502 may transmit an EDMG BRP-TX packet 514, e.g., a single EDMG BRP-TX packet 514, to the responder 540.

For example, transmission of the EDMG BRP-TX packet 514 may include a SS of a plurality of antennas of the initiator 502 over a TRN field of the EDMG BRP-TX packet 514, e.g., using the plurality of orthogonal waveforms, as described above.

In some demonstrative embodiments, for example, as shown in FIG. 5, the responder 540 may operate a plurality of antennas of the responder 540 (DMG ant 1 . . . DMG ant $N_{resp,RX}$), e.g., at a quasi-omnidirectional mode, to receive the EDMG BRP-TX packet 514.

In some demonstrative embodiments, as shown in FIG. 5, during the responder BRP TXSS 569, the responder 540 may transmit an EDMG BRP-TX packet 524, e.g., a single EDMG BRP-TX packet 524, to the initiator 502.

For example, transmission of the EDMG BRP-TX packet 524 may include a SS of a plurality of antennas of the responder 540 over a TRN field of the EDMG BRP-TX packet 524, e.g., using the plurality of orthogonal waveforms, as described above.

In some demonstrative embodiments, for example, as shown in FIG. 5, the initiator may operate a plurality of antennas of the initiator 502 (DMG ant 1 . . . DMG ant $N_{init,RX}$), e.g., at a quasi-omnidirectional mode, to receive the EDMG BRP-TX packet 524.

In some demonstrative embodiments, as shown in FIG. 5, the initiator 502 may transmit a BRP frame 532 including feedback, for example, based on measurements made by the initiator 502 on the EDMG BRP-TX packet 524 from the responder 540.

In some demonstrative embodiments, as shown in FIG. 5, the responder 540 may transmit a BRP frame 534 including feedback, for example, based on measurements made by the responder 540 on the EDMG BRP-TX packet 514 from the initiator 502.

Figure 6:
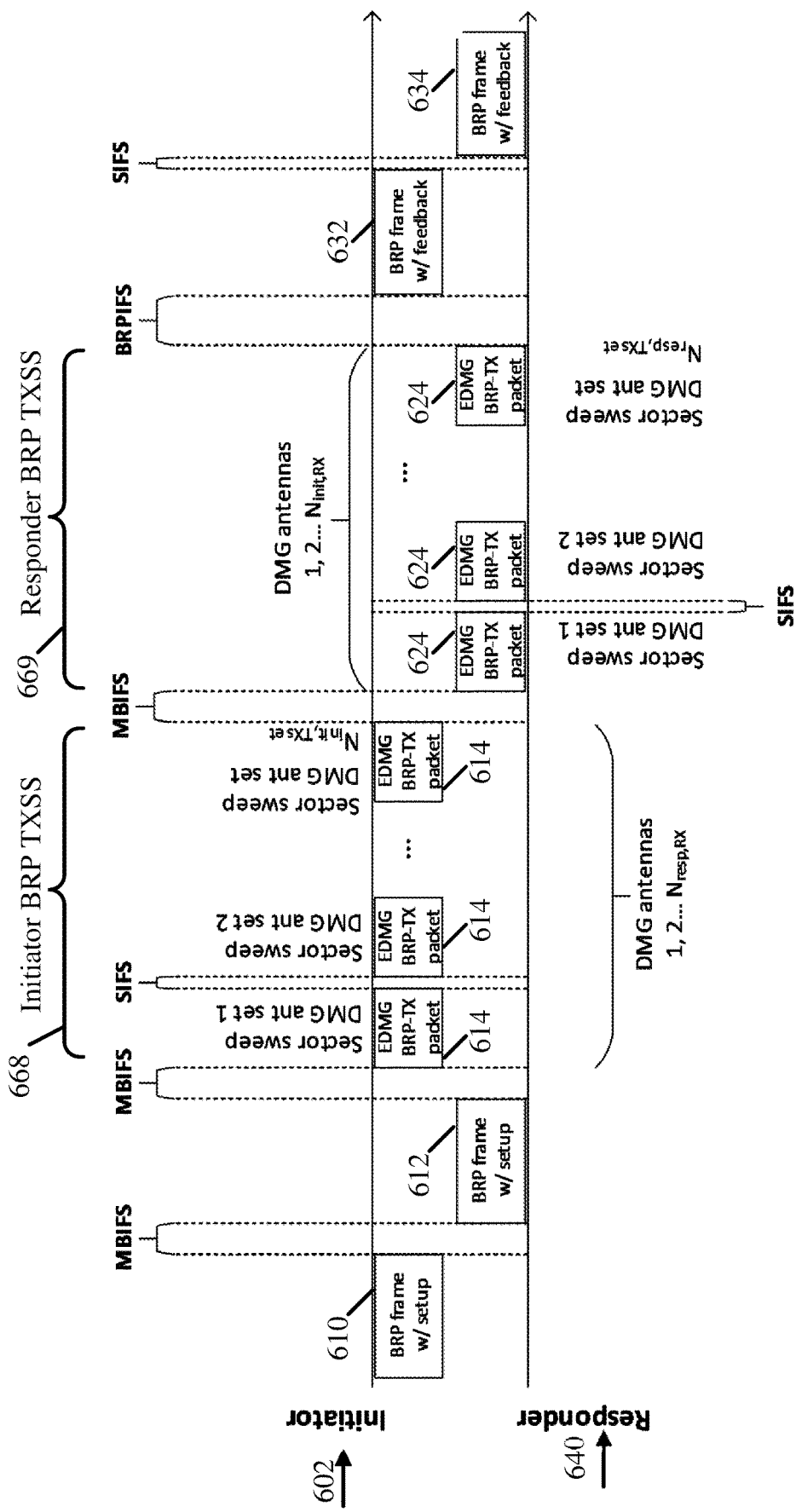
FIG. 6 is a schematic illustration of communications and operations of a MIMO BRP TXSS, in accordance with some demonstrative embodiments.

Reference is made to FIG. 6, which schematically illustrates operations and communications of a MIMO BRP TXSS, in accordance with some demonstrative embodiments.

In some demonstrative embodiments, as shown in FIG. 6, the MIMO BRP TXSS may be performed between a first EDMG STA ("initiator" or "EDMG initiator STA") 602 and a second EDMG STA ("responder" or "EDMG responder STA") 640.

In some demonstrative embodiments, for example, device 102 (FIG. 1) may be configured to perform one or more functionalities of, one or more operations of, and/or a role of, initiator 602; and/or device 140 (FIG. 1) may be configured to perform one or more functionalities of, one or more operations of, and/or a role of, responder 640.

In some demonstrative embodiments, the MIMO BRP TXSS may include an initiator BRP TXSS 668, which may be implemented by the initiator 602 and responder 640, for example, to test a set of transmit AWVs of the initiator 602, for example, against a quasi-omni receive pattern of the responder 640, for example, for one or more combinations, e.g., all possible combinations, of transmit DMG antenna of the initiator 602 and receive DMG antenna of the responder 640.

In some demonstrative embodiments, the MIMO BRP TXSS may include a responder BRP TXSS 669, which may be implemented by the initiator 602 and responder 640, for example, to test a set of transmit AWVs of the responder 640, for example, against a quasi-omni receive pattern of the initiator 602, for example, for one or more combinations, e.g., all possible combinations, of transmit DMG antenna of the responder 640 and receive DMG antenna of the initiator 602.

In some demonstrative embodiments, as shown in FIG. 6, the MIMO BRP TXSS may start (be initiated) with transmission of a BRP frame 610, which indicates the need for transmit MIMO sector sweep by the initiator 602, e.g., during initiator BRP TXSS 668.

In some demonstrative embodiments, the BRP frame 610 may be configured to indicate a MIMO transmit sector sweep to be performed by the responder 640, e.g., during responder BRP TXSS 669.

In one example, at least one field in BRP frame 610 may indicate that the MIMO BRP TXSS is to include responder BRP TXSS 669, e.g., as described above.

In another example, responder BRP TXSS 669 may be defined to be mandatory for the MIMO BRP TXSS, e.g., as described above.

In some demonstrative embodiments, BRP frame 610 may include the TXSS-MIMO field set to the value, e.g., the value one, to indicate the MIMO BRP TXSS is to be performed. In other embodiments, any other field or frame may be used to indicate the MIMO BRP TXSS.

In some demonstrative embodiments, as shown in FIG. 6, the responder 640 may transmit a BRP frame 612 to initiator 602 to confirm the request to initiate the MIMO BRP TXSS.

In some demonstrative embodiments, as shown in FIG. 6, during the initiator BRP TXSS 668, the initiator 602 may transmit a plurality of EDMG BRP-TX packets 614 to the responder 640.

For example, transmission of an EDMG BRP-TX packet 614 may include a SS of a set of a plurality of antennas of the initiator 602 over a TRN field of the EDMG BRP-TX packet 614, for example, using the plurality of orthogonal waveforms, as described above.

For example, as shown in FIG. 6, the initiator 602 may transmit a first EDMG BRP-TX packet 614 via a sector sweep of a first set of DMG antennas (DMG ant set 1) of the initiator 602, a second EDMG BRP-TX packet 614 via a sector sweep of a second DMG antenna set (DMG ant set 2) of the initiator 602, and so on, e.g., until an $N_{int,TXset}$-th EDMG BRP-TX packet 624 via a sector sweep of an $N_{int,TXset}$-th DMG antenna set (DMG ant $N_{int,TXset}$-th) of the initiator 602. In other embodiments, any other number of EDMG BRP-TX packets 614 may be transmitted according to any other antenna configuration of one or more sets of antennas.

In some demonstrative embodiments, for example, as shown in FIG. 6, the responder 640 may operate a plurality of antennas of the responder 640 (DMG ant 1 . . . DMG ant $N_{resp,RX}$), e.g., at a quasi-omnidirectional mode, to receive the EDMG BRP-TX packets 614.

In some demonstrative embodiments, as shown in FIG. 6, during the responder BRP TXSS 669, the responder 640 may transmit a plurality of EDMG BRP-TX packets 624 to the initiator 602.

For example, transmission of an EDMG BRP-TX packet 624 may include a SS of a set of a plurality of antennas of the responder 640 over a TRN field of the EDMG BRP-TX packet 624, for example, using the plurality of orthogonal waveforms, as described above.

For example, as shown in FIG. 6, the responder 640 may transmit a first EDMG BRP-TX packet 624 via a sector sweep of a first set of DMG antennas (DMG ant set 1) of the responder 640, a second EDMG BRP-TX packet 624 via a sector sweep of a second set of DMG antennas (DMG ant set 2) of the responder 640, and so on, e.g., until an $N_{resp,TXset}$-th EDMG BRP-TX packet 624 via a sector sweep of an $N_{resp,TXset}$th of DMG antennas (DMG ant set $N_{resp,TXset}$th) of the responder 640. In other embodiments, any other number of EDMG BRP-TX packets 624 may be transmitted according to any other antenna configuration of one or more antenna sets.

In some demonstrative embodiments, for example, as shown in FIG. 6, the initiator may operate a plurality of antennas of the initiator 602 (DMG ant 1 . . . DMG ant $N_{init,RX}$), e.g., at a quasi-omnidirectional mode, to receive the EDMG BRP-TX packets 624.

In some demonstrative embodiments, as shown in FIG. 6, the initiator 602 may transmit a BRP frame 632 including feedback, for example, based on measurements made by the initiator 602 on the EDMG BRP-TX packets 624 from the responder 640.

In some demonstrative embodiments, as shown in FIG. 6, the responder 640 may transmit a BRP frame 634 including feedback, for example, based on measurements made by the responder 640 on the EDMG BRP-TX packets 614 from the initiator 602.

Referring back to FIG. 1, in some demonstrative embodiments, devices 102 and/or 140 may be configured to initiate the BRP TXSS using an exchange of BRP frames, e.g., as described above. In one example, in some use cases, implementations and/or scenarios, the exchange of the BRP frames may be defined as mandatory, e.g., to initiate the BRP TXSS.

In other embodiments, devices 102 and/or 140 may be configured to initiate the BRP TXSS, for example, even without the exchange of BRP frames.

In some demonstrative embodiments, for example, a BRP TXSS may be initiated without an exchange of BRP frames with setup information, for example, by defining that a BRP TXSS is to start with the transmission of an EDMG BRP-TX packet by the initiator.

In some demonstrative embodiments, devices 102 and/or 140 may be configured to perform beamforming training, for example, SU-SISO and/or SU-MIMO beamforming training, using BRP TXSS, for example, according to one or more operations, definitions, settings and/or procedures, e.g., as described below. In some demonstrative embodiments, devices 102 and/or 140 may be configured to perform beamforming training according to some or all of the operations, definitions, settings and/or procedures described below, and/or by performing one or more additional or alternative operations and/or procedures.

In some demonstrative embodiments, for example, a SISO BRP TXSS may be defined as a BRP TXSS in which EDMG BRP-TX packets used in the procedure are transmitted using a single transmit chain (SISO transmission).

In some demonstrative embodiments, for example, a MIMO BRP TXSS may be defined as a BRP TXSS in which EDMG BRP-TX packets used in the procedure are transmitted using multiple transmit chains (MIMO transmission).

In some demonstrative embodiments, for example, a DMG antenna and TRN-Unit configuration may be defined during BRP TXSS, e.g., as described below.

In one example, all fields of EDMG BRP-TX packets used in MIMO BRP TXSS shall be transmitted with more than one transmit chain of the transmitter and use an EDMG PPDU defined for MIMO transmission, e.g., in accordance with an IEEE 802.11ay Specification.

In one example, the TRN field of EDMG BRP-TX packets used in MIMO BRP TXSS shall consist of N orthogonal waveforms, where N is the number of transmit chains used in the transmission of the packet.

In one example, in a MIMO BRP TXSS, channel measurements shall be obtained during the reception of a single EDMG BRP-TX packet.

In one example, a STA that is part of a MIMO BRP TXSS and receives EDMG BRP-TX packets shall perform channel measurements using all of its DMG antennas, e.g., simultaneously, and provide feedback for each of its DMG antennas.

In one example, the total number of AWV combinations used in the transmit training of a STA shall be equal to the sum of all AWV configurations employed on all DMG antennas of the transmitter multiplied by the number of DMG antennas of the receiver.

In one example, the TRN-Unit RX Pattern field in the EDMG-Header-A of EDMG BRP-TX packets used in MIMO BRP TXSS shall be set to 1.

In one example, the TXSS-RECIPROCAL subfield within the EDMG BRP Request element in the BRP frame sent by the initiator to start a MIMO BRP TXSS shall be equal to 0.

In one example, for EDMG BRP-TX packets transmitted in a MIMO BRP TXSS, the value of the TXVECTOR parameter EDMG_TRN_LEN shall be set to k, where k is the number of TRN-Units used in the transmit training.

In some demonstrative embodiments, some or all of the definitions and/or configurations defined above may be implemented, and/or one or more additional or alternative definitions and/or configurations may be implemented.

In some demonstrative embodiments, an execution of the BRP TXSS may be defined to include one or more operations, e.g., as described below.

In one example, a BRP TXSS shall complete within the Contention Based Access Period (CBAP) or Service Period (SP) in which it was initiated.

In one example, an FBCK-REQ subfield in the DMG Beam Refinement element carried within the BRP frame that initiates a BRP TXSS shall be set to 10001 (binary).

In one example, a BRP TXSS shall be initiated with either a BRP frame exchange or with the transmission of an EDMG BRP-TX packet, e.g., as follows:

If a BRP TXSS includes a setup phase, the initiator sends a BRP frame with the TXSS-REQUEST subfield in the EDMG BRP Request element set to 1 and, for a SISO BRP TXSS procedure, the TXSS-SECTORS subfield set to indicate the total number of transmit sectors the initiator uses in the procedure combined over all of its DMG antennas. For a MIMO BRP TXSS procedure, the TXSS-SECTORS subfield shall be set to zero. To confirm the BRP TXSS execution, the responder shall respond with a BRP frame containing a DMG Beam Refinement element with the TXSS-OK subfield set to 1 MBIFS interval after the reception of the first BRP frame. Both the BRP frame sent by the initiator to initiate the BRP TXSS and the BRP frame sent by the responder to confirm the BRP TXSS execution shall not include a TRN field.

If a BRP TXSS does not include a setup phase, the initiator shall initiate a BRP TXSS with the transmission of an EDMG BRP-TX packet. A BRP TXSS shall only be initiated with the transmission of an EDMG BRP-TX packet if the BRP TXSS is a SISO BRP TXSS and if it does not include a Responder BRP TXSS. The TXSS-REQUEST subfield in the EDMG BRP Request element of the EDMG BRP-TX packet that initiates the BRP TXSS shall be set to 1. The TXSS-SECTORS subfield in the packet shall be set to indicate the total number of transmit sectors the initiator uses in the procedure combined over all of its DMG antennas.

In other embodiments, any other additional or alternative criteria and/or operations may be implemented to initiate the BRP TXSS.

In one example, the TXSS-RESPONDER subfield in the EDMG BRP Request element of the BRP frame that initiates the BRP TXSS shall be set to 1 when the procedure includes an Initiator BRP TXSS and a Responder BRP TXSS. If the BRP TXSS does not include a Responder BRP TXSS, the TXSS-RESPONDER subfield in the EDMG BRP Request element of the BRP frame that initiates the BRP TXSS shall be set to 0.

In other embodiments, any other explicit or implicit indication of the responder BRP TXSS may be implemented, e.g., as described above.

In one example, in the setup phase of a BRP TXSS that includes a Responder BRP TXSS, the BRP frame sent by the responder to confirm the BRP TXSS execution shall include in the TXSS-SECTORS subfield the total number of transmit sectors that will use in the transmit training.

In one example, the TXSS-RESPONDER subfield in the EDMG BRP Request element of the BRP frame that initiates the BRP TXSS shall be set to 1, for example, only if the TXSS-RECIPROCAL subfield in the EDMG BRP Request element of the same frame is set to 0.

In one example, the TXSS-MIMO subfield in the EDMG BRP Request element of the BRP frame that initiates the BRP TXSS shall be set to 1, for example, when the procedure is a MIMO BRP TXSS. For example, if the procedure is a SISO BRP TXSS, the TXSS-MIMO subfield in the EDMG BRP Request element of the BRP frame that initiates the BRP TXSS shall be set to 0. In one example, both initiator and responder of a BRP TXSS shall be SU-MIMO capable for the TXSS-MIMO subfield to be set to 1.

In one example, the TXSS-MIMO subfield in the EDMG BRP Request element of the BRP frame that initiates the BRP TXSS shall be set to 1, for example, only if the TXSS-RECIPROCAL subfield in the EDMG BRP Request element of the same frame is set to 0.

In one example, if a BRP TXSS does not include a setup phase, the TXSS-MIMO subfield and the TXSS-RESPONDER subfield in the EDMG BRP Request element of the BRP frame that initiates the BRP TXSS shall both be set to 0.

In one example, if a BRP TXSS includes a setup phase, the initiator shall transmit the first EDMG BRP-TX packet MBIFS interval after the reception of the BRP frame sent by the responder confirming the BRP TXSS execution.

In one example, in a SISO BRP TXSS, the EDMG BRP-TX packets sent by the initiator in a BRP TXSS procedure shall be separated by SIFS interval. For example, if the procedure includes a Responder BRP TXSS, the responder shall send the first EDMG BRP-TX packet MBIFS after the last EDMG BRP-TX packet transmitted by the initiator. For example, the EDMG BRP-TX packets sent by the responder in a BRP TXSS procedure shall be separated by SIFS interval.

In one example, in a MIMO BRP TXSS, if the procedure includes a Responder BRP TXSS, the responder shall transmit an EDMG BRP TXSS MBIFS after the EDMG BRP-TX packet transmitted by the initiator.

In some demonstrative embodiments, for example, for a SISO BRP TXSS procedure, the following may be performed:

If the TXSS-RECIPROCAL subfield within the EDMG BRP Request element in the BRP frame sent to start the procedure is 0, the initiator shall transmit $N_{init,TX}$ EDMG BRP-TX packets per each DMG antenna of the responder. The total number of sectors trained in the $N_{init,TX}$ EDMG BRP-TX packets sent is N, where N is equal to the value of the TXSS-SECTORS subfield in the EDMG BRP Request element sent in the BRP frame that started the BRP TXSS procedure. If the responder has more than one receive DMG antenna, the initiator repeats the transmission of the $N_{init,TX}$ EDMG BRP-TX packets for the number of DMG antennas indicated in the last negotiated Number of RX DMG Antennas field transmitted by the responder to the initiator. If the TXSS-RESPONDER subfield within the EDMG BRP Request element in the BRP frame sent to start the procedure was 1, the responder shall then transmit $N_{resp,TX}$ EDMG BRP-TX packets per each DMG antenna of the initiator. The total number of sectors trained in the $N_{resp,TX}$ EDMG BRP-TX packets sent is N, where N is equal to the value of the TXSS-SECTORS subfield in the EDMG BRP Request element sent in the BRP frame that confirmed the BRP TXSS procedure. If the initiator has more than one receive DMG antenna, the responder repeats the transmission of the $N_{resp,TX}$ EDMG BRP-TX packets for the number of DMG antennas indicated in the last negotiated Number of RX DMG Antennas field transmitted by the initiator to the responder.

If the TXSS-RECIPROCAL subfield within the EDMG BRP Request element in the BRP frame sent to start the procedure is 1, the initiator shall transmit one EDMG BRP-TX packet to the responder. The total number of sectors trained in the packet is N, where N is equal to the value of the TXSS-SECTORS subfield in the EDMG BRP Request element sent in the BRP frame that started the procedure.

In one example, for a MIMO BRP TXSS procedure, the initiator shall transmit one or more EDMG BRP-TX packets and, the TRN field of the EDMG BRP-TX packet shall consist of N orthogonal waveforms, where N is the number of transmit chains of the initiator. For example, the receiver shall obtain channel measurements during the reception of the transmitted EDMG BRP-TX packets using all of its DMG antennas simultaneously, and provide feedback for each of its DMG antennas.

For example, if the TXSS-RESPONDER subfield within the EDMG BRP Request element in the BRP frame sent to start the procedure was 1, the responder shall then transmit one or more EDMG BRP-TX packets and the TRN field of the EDMG BRP-TX packet shall consist of N orthogonal waveforms, where N is the number of transmit chains of the responder.

In one example, for each EDMG BRP-TX packet transmitted in a BRP TXSS procedure, the Packet Type field within the L-Header and the EDMG TRN Length, EDMG TRN-Unit P, EDMG TRN-Unit M, and EDMG TRN-Unit N fields in the EDMG-Header-A are set to indicate the configuration of the TRN field appended to the packets.

In some demonstrative embodiments, one or more of the following operations and/or definitions may be implemented for feedback of the BRP TXSS.

In one example, BRP frames with feedback exchanged in a BRP TXSS shall not include a TRN field.

In one example, if the BRP TXSS does not include a Responder BRP TXSS, the responder shall send a BRP frame to the initiator containing feedback based on measurements it performed during the BRP TXSS. For example, the BRP frame with feedback transmitted by the responder may be separated from the last EDMG BRP-TX packet transmitted by the initiator by a BRP IFS (BRPIFS) interval.

In one example, if the BRP TXSS includes a Responder BRP TXSS, the initiator shall send a BRP frame to the responder containing feedback based on measurements it performed.

In one example, the BRP frame with feedback transmitted by the initiator is separated from the last EDMG BRP-TX packet transmitted by the responder by a BRPIFS interval.

In one example, the responder shall then send a BRP frame to the initiator containing feedback based on measurements it performed.

In one example, the BRP frame with feedback sent by the responder is separated from the BRP frame with feedback sent by the initiator by a SIFS interval.

In one example, the BRP packet sent by the responder with feedback of a BRP TXSS shall be transmitted with the same DMG antenna and antenna configuration used in the transmission of the BRP frame with acknowledgement in the BRP frame exchange used to initiate the BRP TXSS.

In one example, the BRP packet sent by the responder with feedback of a BRP TXSS shall be received by the initiator with the same DMG antenna and antenna configuration used in the reception of the BRP frame with acknowledgement sent by the responder in the BRP frame exchange used to initiate the BRP TXSS.

In one example, if the BRP TXSS includes a Responder BRP TXSS, the BRP packet sent by the initiator with feedback shall be transmitted with the same DMG antenna and antenna configuration used in the transmission of the BRP frame that initiated the BRP TXSS.

In one example, the BRP packet sent by the initiator with feedback shall be received by the responder with the same DMG antenna and antenna configuration used in the reception of the BRP frame sent by the initiator that initiated the BRP TXSS.

In one example, the BRP TXSS procedure may be completed when the responder transmits the BRP packet containing the feedback.

In some demonstrative embodiments, one or more new or dedicated fields may be defined, for example, in the EDMG BRP Request element, e.g., as described below. In other embodiments, any other additional or alternative fields may be used.

In one example, if the TXSS-REQUEST field is equal to one, the TXSS-RESPONDER field set to one indicates that the requested BRP TXSS includes a Responder BRP TXSS.

In one example, if the TXSS-REQUEST field is equal to one, the TXSS-RESPONDER field set to zero indicates that the requested BRP TXSS does not include a Responder BRP TXSS.

In one example, if the TXSS-REQUEST field is equal to zero, the TXSS-RESPONDER field is reserved.

In one example, if the TXSS-REQUEST field is equal to one, the TXSS-MIMO field set to one indicates that the requested BRP TXSS is a MIMO BRP TXSS.

In one example, if the TXSS-REQUEST field is equal to one, the TXSS-MIMO field set to zero indicates that the requested BRP TXSS is a SISO BRP TXSS.

In one example, if the TXSS-REQUEST field is equal to zero, the TXSS-MIMO field is reserved.

Figure 7:
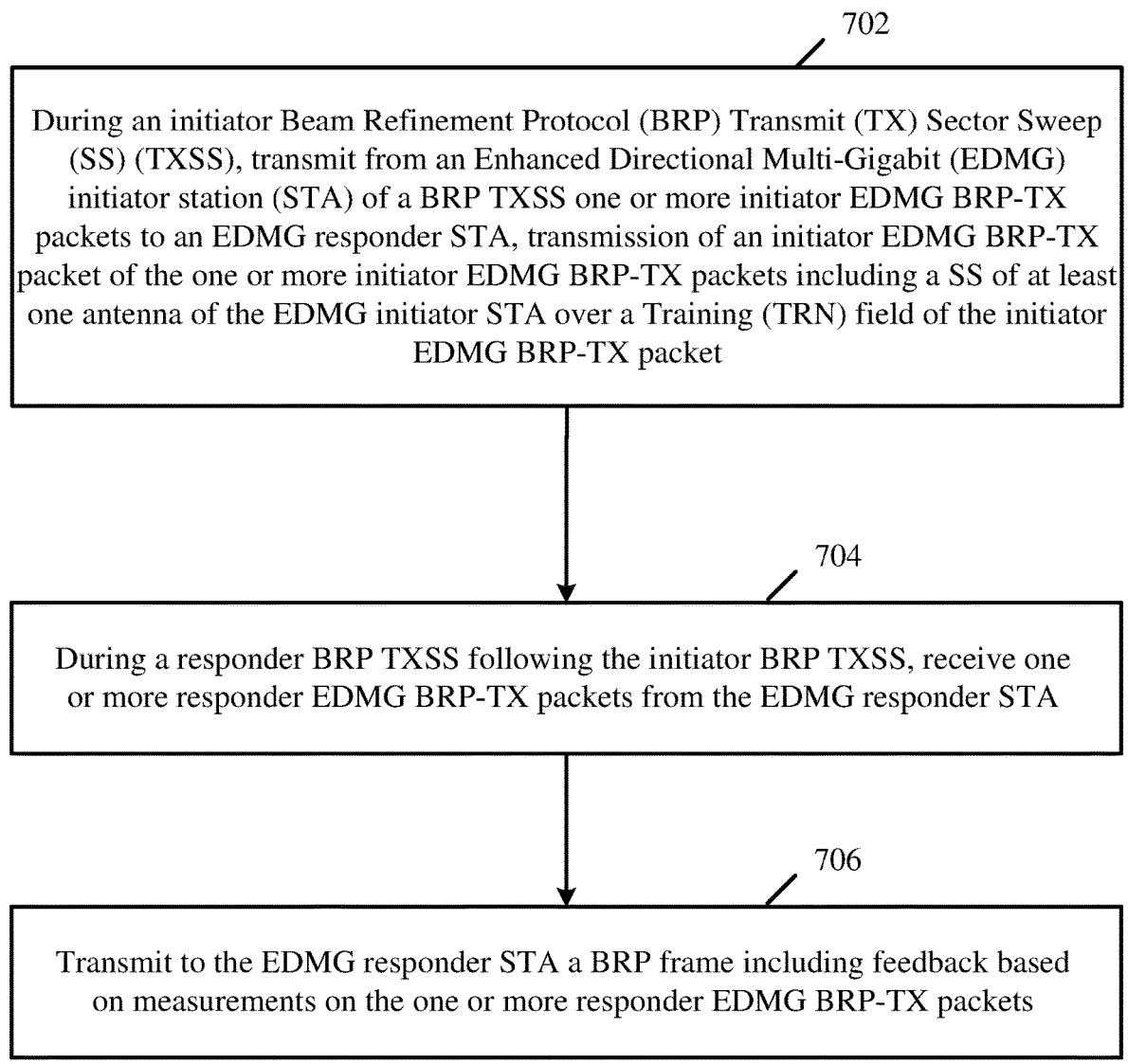
FIG. 7 is a schematic flow-chart illustration of a method of BRP TXSS, in accordance with some demonstrative embodiments.

Reference is made to FIG. 7, which illustrates a method of BRP TXSS, in accordance with some demonstrative embodiments. For example, one or more of the operations of the method of FIG. 7 may be performed by one or more elements of a system, e.g., system 100 (FIG. 1), for example, one or more wireless devices, e.g., device 102 (FIG. 1), and/or device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 702, the method may include, during an initiator BRP TXSS, transmitting one or more initiator EDMG BRP-TX packets from an EDMG initiator STA to an EDMG responder STA. For example, transmission of an initiator EDMG BRP-TX packet of the one or more initiator EDMG BRP-TX packets may include a SS of at least one antenna of the EDMG initiator STA over a TRN field of the initiator EDMG BRP-TX packet. For example, controller 124 (FIG. 1) may be configured to cause, trigger, and/or control the wireless station implemented by device 102 (FIG. 1) to transmit the one or more initiator EDMG BRP-TX packets, e.g., as described above.

As indicated at block 704, the method may include, during a responder BRP TXSS following the initiator BRP TXSS, receiving one or more responder EDMG BRP-TX packets from the EDMG responder STA. For example, controller 124 (FIG. 1) may be configured to cause, trigger, and/or control the wireless station implemented by device 102 (FIG. 1) to receive the one or more responder EDMG BRP-TX packets, e.g., as described above.

As indicated at block 706, the method may include transmitting to the EDMG responder STA a BRP frame including feedback based on measurements on the one or more responder EDMG BRP-TX packets. For example, controller 124 (FIG. 1) may be configured to cause, trigger, and/or control the wireless station implemented by device 102 (FIG. 1) to transmit the BRP frame with the feedback, e.g., as described above.

Figure 8:
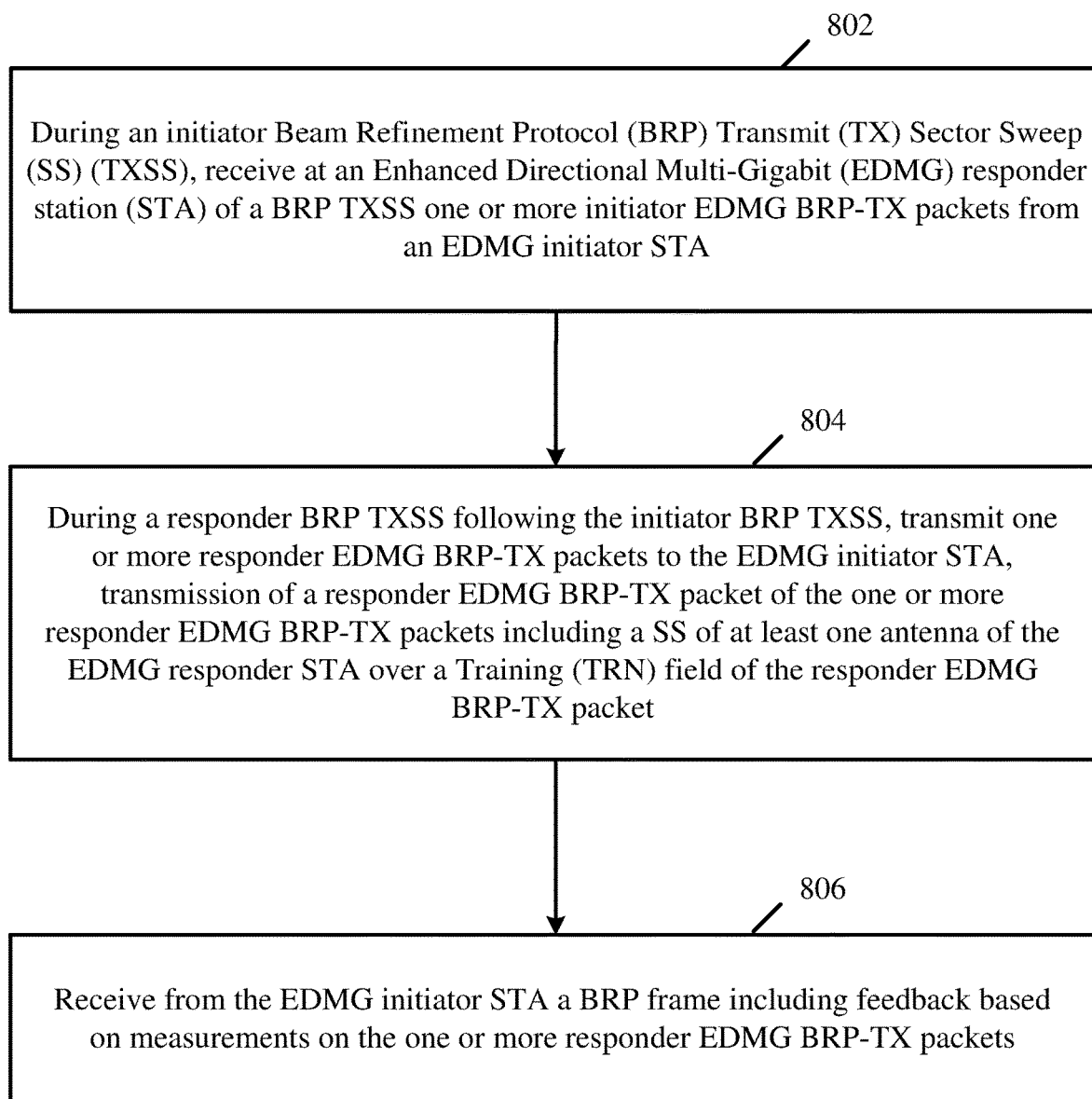
FIG. 8 is a schematic flow-chart illustration of a method of BRP TXSS, in accordance with some demonstrative embodiments.

Reference is made to FIG. 8, which illustrates a method of BRP TXSS, in accordance with some demonstrative embodiments. For example, one or more of the operations of the method of FIG. 8 may be performed by one or more elements of a system, e.g., system 100 (FIG. 1), for example, one or more wireless devices, e.g., device 102 (FIG. 1), and/or device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 802, the method may include, during an initiator BRP TXSS, receiving at an EDMG responder STA one or more initiator EDMG BRP-TX packets from an EDMG initiator STA. For example, controller 154 (FIG. 1) may be configured to cause, trigger, and/or control the wireless station implemented by device 140 (FIG. 1) to receive the one or more initiator EDMG BRP-TX packets from device 102 (FIG. 1), e.g., as described above.

As indicated at block 804, the method may include, during a responder BRP TXSS following the initiator BRP TXSS, transmitting one or more responder EDMG BRP-TX packets to the EDMG initiator STA. For example, transmission of a responder EDMG BRP-TX packet of the one or more responder EDMG BRP-TX packets may include a SS of at least one antenna of the EDMG responder STA over a TRN field of the responder EDMG BRP-TX packet. For example, controller 154 (FIG. 1) may be configured to cause, trigger, and/or control the wireless station implemented by device 140 (FIG. 1) to transmit the one or more responder EDMG BRP-TX packets to device 102 (FIG. 1), e.g., as described above.

As indicated at block 806, the method may include receiving from the EDMG initiator STA a BRP frame including feedback based on measurements on the one or more responder EDMG BRP-TX packets. For example, controller 154 (FIG. 1) may be configured to cause, trigger, and/or control the wireless station implemented by device 140 (FIG. 1) to receive the BRP frame with the feedback from device 102 (FIG. 1), e.g., as described above.

Figure 9:
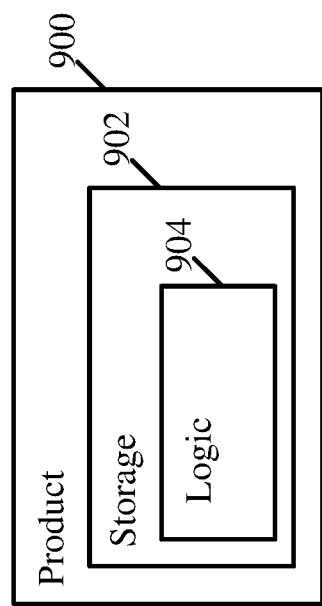
FIG. 9 is a schematic illustration of a product of manufacture, in accordance with some demonstrative embodiments.

Reference is made to FIG. 9, which schematically illustrates a product of manufacture 900, in accordance with some demonstrative embodiments. Product 900 may include one or more tangible computer-readable ("machine-readable") non-transitory storage media 902, which may include computer-executable instructions, e.g., implemented by logic 904, operable to, when executed by at least one computer processor, enable the at least one computer processor to implement one or more operations at device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1), to cause device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1) to perform, trigger and/or implement one or more operations and/or functionalities, and/or to perform, trigger and/or implement one or more operations and/or functionalities described with reference to the FIGS. 1, 2, 3, 4, 5, 6, 7, and/or 8, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative embodiments, product 900 and/or machine readable storage media 902 may include one or more types of computer-readable storage media capable of storing data, including volatile memory, non-volatile memory, removable or non-removable memory, erasable or non-erasable memory, writeable or re-writeable memory, and the like. For example, machine readable storage media 902 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 904 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 904 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause an Enhanced Directional Multi-Gigabit (EDMG) initiator station (STA) of a Beam Refinement Protocol (BRP) Transmit (TX) Sector Sweep (SS) (TXSS) to, during an initiator BRP TXSS, transmit one or more initiator EDMG BRP-TX packets to an EDMG responder STA, transmission of an initiator EDMG BRP-TX packet of the one or more initiator EDMG BRP-TX packets comprising a SS of at least one antenna of the EDMG initiator STA over a Training (TRN) field of the initiator EDMG BRP-TX packet; during a responder BRP TXSS following the initiator BRP TXSS, receive one or more responder EDMG BRP-TX packets from the EDMG responder STA; and transmit to the EDMG responder STA a BRP frame comprising feedback based on measurements on the one or more responder EDMG BRP-TX packets.

Example 2 includes the subject matter of Example 1, and optionally, wherein the apparatus is configured to cause the EDMG initiator STA to transmit to the EDMG responder STA a setup BRP frame comprising an EDMG BRP request element to initiate the BRP TXSS, the EDMG BRP request element comprising a TXSS Multiple Input Multiple Output (MIMO) (TXSS-MIMO) field comprising a value to indicate whether the BRP TXSS is a Single Input Single Output (SISO) BRP TXSS or a MIMO BRP TXSS.

Example 3 includes the subject matter of Example 2, and optionally, wherein the apparatus is configured to cause the EDMG initiator STA to set the TXSS-MIMO field to a value of zero to indicate that the BRP TXSS is the SISO BRP TXSS in which the EDMG initiator STA is to transmit the one or more initiator EDMG BRP-TX packets using a single transmit chain.

Example 4 includes the subject matter of Example 2, and optionally, wherein the apparatus is configured to cause the EDMG initiator STA to set the TXSS-MIMO field to a value of one to indicate that the BRP TXSS is the MIMO BRP TXSS in which the EDMG initiator STA is to transmit the one or more initiator EDMG BRP-TX packets using multiple transmit chains.

Example 5 includes the subject matter of Example 4, and optionally, wherein the TRN field of the initiator EDMG BRP-TX packet comprises a plurality of orthogonal waveforms, a count of the plurality of orthogonal waveforms is based on a count of a plurality of transmit chains to transmit the initiator EDMG BRP-TX packet.

Example 6 includes the subject matter of Example 4 or 5, and optionally, wherein the apparatus is configured to cause the EDMG initiator STA to set for the one or more initiator EDMG BRP-TX packets a value of a TXVECTOR parameter EDMG_TRN_LEN to k, wherein k denotes a count of TRN units to be used in transmit training.

Example 7 includes the subject matter of any one of Examples 4-6, and optionally, wherein the apparatus is configured to cause the EDMG initiator STA to set to 1 a TRN-Unit Receive (RX) pattern field in an EDMG Header A of the initiator EDMG BRP-TX packet.

Example 8 includes the subject matter of any one of Examples 1-7, and optionally, wherein the apparatus is configured to cause the EDMG initiator STA to transmit to the EDMG responder STA a setup BRP frame comprising an EDMG BRP request element to initiate the BRP TXSS, a field in the EDMG BRP request element to indicate that the BRP TXSS is to include the responder BRP TXSS.

Example 9 includes the subject matter of any one of Examples 1-8, and optionally, wherein the apparatus is configured to cause the EDMG initiator STA to transmit the BRP frame comprising the feedback using a same antenna configuration as an antenna configuration for transmission of a setup BRP frame comprising an EDMG BRP request element to initiate the BRP TXSS.

Example 10 includes the subject matter of any one of Examples 1-9, and optionally, wherein the apparatus is configured to cause the EDMG initiator STA to begin the responder BRP TXSS a Medium Beamforming Inter-Frame Space (MBIFS) after the initiator BRP TXSS.

Example 11 includes the subject matter of any one of Examples 1-10, and optionally, wherein the apparatus is configured to cause the EDMG initiator STA to repeat transmission of the one or more initiator EDMG BRP-TX packets based on a count of antennas of the EDMG responder STA.

Example 12 includes the subject matter of any one of Examples 1-11, and optionally, wherein the apparatus is configured to cause the EDMG initiator STA to receive from the EDMG responder STA a responder BRP frame comprising feedback based on measurements on the one or more initiator EDMG BRP-TX packets.

Example 13 includes the subject matter of any one of Examples 1-12, and optionally, wherein the apparatus is configured to cause the EDMG initiator STA to transmit the one or more initiator EDMG BRP-TX packets over a channel bandwidth in a frequency band above 45 Gigahertz (GHz).

Example 14 includes the subject matter of any one of Examples 1-13, and optionally, wherein the apparatus is configured to cause the EDMG initiator STA to transmit the one or more initiator EDMG BRP-TX packets over a channel bandwidth of 4.32 Gigahertz (GHz), 6.48 GHz, or 8.64 GHz.

Example 15 includes the subject matter of any one of Examples 1-14, and optionally, comprising a radio to transmit the one or more initiator EDMG BRP-TX packets.

Example 16 includes the subject matter of any one of Examples 1-15, and optionally, comprising a plurality of antennas, a memory, and a processor.

Example 17 includes a system of wireless communication comprising an Enhanced Directional Multi-Gigabit (EDMG) initiator station (STA) of a Beam Refinement Protocol (BRP) Transmit (TX) Sector Sweep (SS) (TXSS), the EDMG initiator STA comprising a plurality of antennas; a radio; a memory; a processor; and a controller configured to cause the EDMG initiator STA to, during an initiator BRP TXSS, transmit one or more initiator EDMG BRP-TX packets to an EDMG responder STA, transmission of an initiator EDMG BRP-TX packet of the one or more initiator EDMG BRP-TX packets comprising a SS of at least one antenna of the EDMG initiator STA over a Training (TRN) field of the initiator EDMG BRP-TX packet; during a responder BRP TXSS following the initiator BRP TXSS, receive one or more responder EDMG BRP-TX packets from the EDMG responder STA; and transmit to the EDMG responder STA a BRP frame comprising feedback based on measurements on the one or more responder EDMG BRP-TX packets.

Example 18 includes the subject matter of Example 17, and optionally, wherein the controller is configured to cause the EDMG initiator STA to transmit to the EDMG responder STA a setup BRP frame comprising an EDMG BRP request element to initiate the BRP TXSS, the EDMG BRP request element comprising a TXSS Multiple Input Multiple Output (MIMO) (TXSS-MIMO) field comprising a value to indicate whether the BRP TXSS is a Single Input Single Output (SISO) BRP TXSS or a MIMO BRP TXSS.

Example 19 includes the subject matter of Example 18, and optionally, wherein the controller is configured to cause the EDMG initiator STA to set the TXSS-MIMO field to a value of zero to indicate that the BRP TXSS is the SISO BRP TXSS in which the EDMG initiator STA is to transmit the one or more initiator EDMG BRP-TX packets using a single transmit chain.

Example 20 includes the subject matter of Example 18, and optionally, wherein the controller is configured to cause the EDMG initiator STA to set the TXSS-MIMO field to a value of one to indicate that the BRP TXSS is the MIMO BRP TXSS in which the EDMG initiator STA is to transmit the one or more initiator EDMG BRP-TX packets using multiple transmit chains.

Example 21 includes the subject matter of Example 20, and optionally, wherein the TRN field of the initiator EDMG BRP-TX packet comprises a plurality of orthogonal waveforms, a count of the plurality of orthogonal waveforms is based on a count of a plurality of transmit chains to transmit the initiator EDMG BRP-TX packet.

Example 22 includes the subject matter of Example 20 or 21, and optionally, wherein the controller is configured to cause the EDMG initiator STA to set for the one or more initiator EDMG BRP-TX packets a value of a TXVECTOR parameter EDMG_TRN_LEN to k, wherein k denotes a count of TRN units to be used in transmit training.

Example 23 includes the subject matter of any one of Examples 20-22, and optionally, wherein the controller is configured to cause the EDMG initiator STA to set to 1 a TRN-Unit Receive (RX) pattern field in an EDMG Header A of the initiator EDMG BRP-TX packet.

Example 24 includes the subject matter of any one of Examples 17-23, and optionally, wherein the controller is configured to cause the EDMG initiator STA to transmit to the EDMG responder STA a setup BRP frame comprising an EDMG BRP request element to initiate the BRP TXSS, a field in the EDMG BRP request element to indicate that the BRP TXSS is to include the responder BRP TXSS.

Example 25 includes the subject matter of any one of Examples 17-24, and optionally, wherein the controller is configured to cause the EDMG initiator STA to transmit the BRP frame comprising the feedback using a same antenna configuration as an antenna configuration for transmission of a setup BRP frame comprising an EDMG BRP request element to initiate the BRP TXSS.

Example 26 includes the subject matter of any one of Examples 17-25, and optionally, wherein the controller is configured to cause the EDMG initiator STA to begin the responder BRP TXSS a Medium Beamforming Inter-Frame Space (MBIFS) after the initiator BRP TXSS.

Example 27 includes the subject matter of any one of Examples 17-26, and optionally, wherein the controller is configured to cause the EDMG initiator STA to repeat transmission of the one or more initiator EDMG BRP-TX packets based on a count of antennas of the EDMG responder STA.

Example 28 includes the subject matter of any one of Examples 17-27, and optionally, wherein the controller is configured to cause the EDMG initiator STA to receive from the EDMG responder STA a responder BRP frame comprising feedback based on measurements on the one or more initiator EDMG BRP-TX packets.

Example 29 includes the subject matter of any one of Examples 17-28, and optionally, wherein the controller is configured to cause the EDMG initiator STA to transmit the one or more initiator EDMG BRP-TX packets over a channel bandwidth in a frequency band above 45 Gigahertz (GHz).

Example 30 includes the subject matter of any one of Examples 17-29, and optionally, wherein the controller is configured to cause the EDMG initiator STA to transmit the one or more initiator EDMG BRP-TX packets over a channel bandwidth of 4.32 Gigahertz (GHz), 6.48 GHz, or 8.64 GHz.

Example 31 includes a method to be performed at an Enhanced Directional Multi-Gigabit (EDMG) initiator station (STA) of a Beam Refinement Protocol (BRP) Transmit (TX) Sector Sweep (SS) (TXSS), the method comprising, during an initiator BRP TXSS, transmitting one or more initiator EDMG BRP-TX packets to an EDMG responder STA, transmission of an initiator EDMG BRP-TX packet of the one or more initiator EDMG BRP-TX packets comprising a SS of at least one antenna of the EDMG initiator STA over a Training (TRN) field of the initiator EDMG BRP-TX packet; during a responder BRP TXSS following the initiator BRP TXSS, receiving one or more responder EDMG BRP-TX packets from the EDMG responder STA; and transmitting to the EDMG responder STA a BRP frame comprising feedback based on measurements on the one or more responder EDMG BRP-TX packets.

Example 32 includes the subject matter of Example 31, and optionally, comprising transmitting to the EDMG responder STA a setup BRP frame comprising an EDMG BRP request element to initiate the BRP TXSS, the EDMG BRP request element comprising a TXSS Multiple Input Multiple Output (MIMO) (TXSS-MIMO) field comprising a value to indicate whether the BRP TXSS is a Single Input Single Output (SISO) BRP TXSS or a MIMO BRP TXSS.

Example 33 includes the subject matter of Example 32, and optionally, comprising setting the TXSS-MIMO field to a value of zero to indicate that the BRP TXSS is the SISO BRP TXSS in which the EDMG initiator STA is to transmit the one or more initiator EDMG BRP-TX packets using a single transmit chain.

Example 34 includes the subject matter of Example 32, and optionally, comprising setting the TXSS-MIMO field to a value of one to indicate that the BRP TXSS is the MIMO BRP TXSS in which the EDMG initiator STA is to transmit the one or more initiator EDMG BRP-TX packets using multiple transmit chains.

Example 35 includes the subject matter of Example 34, and optionally, wherein the TRN field of the initiator EDMG BRP-TX packet comprises a plurality of orthogonal waveforms, a count of the plurality of orthogonal waveforms is based on a count of a plurality of transmit chains to transmit the initiator EDMG BRP-TX packet.

Example 36 includes the subject matter of Example 34 or 35, and optionally, comprising setting for the one or more initiator EDMG BRP-TX packets a value of a TXVECTOR parameter EDMG_TRN_LEN to k, wherein k denotes a count of TRN units to be used in transmit training.

Example 37 includes the subject matter of any one of Examples 34-36, and optionally, comprising setting to 1 a TRN-Unit Receive (RX) pattern field in an EDMG Header A of the initiator EDMG BRP-TX packet.

Example 38 includes the subject matter of any one of Examples 31-37, and optionally, comprising transmitting to the EDMG responder STA a setup BRP frame comprising an EDMG BRP request element to initiate the BRP TXSS, a field in the EDMG BRP request element to indicate that the BRP TXSS is to include the responder BRP TXSS.

Example 39 includes the subject matter of any one of Examples 31-38, and optionally, comprising transmitting the BRP frame comprising the feedback using a same antenna configuration as an antenna configuration for transmission of a setup BRP frame comprising an EDMG BRP request element to initiate the BRP TXSS.

Example 40 includes the subject matter of any one of Examples 31-39, and optionally, comprising beginning the responder BRP TXSS a Medium Beamforming Inter-Frame Space (MBIFS) after the initiator BRP TXSS.

Example 41 includes the subject matter of any one of Examples 31-40, and optionally, comprising repeating transmission of the one or more initiator EDMG BRP-TX packets based on a count of antennas of the EDMG responder STA.

Example 42 includes the subject matter of any one of Examples 31-41, and optionally, comprising receiving from the EDMG responder STA a responder BRP frame comprising feedback based on measurements on the one or more initiator EDMG BRP-TX packets.

Example 43 includes the subject matter of any one of Examples 31-42, and optionally, comprising transmitting the one or more initiator EDMG BRP-TX packets over a channel bandwidth in a frequency band above 45 Gigahertz (GHz).

Example 44 includes the subject matter of any one of Examples 31-43, and optionally, comprising transmitting the one or more initiator EDMG BRP-TX packets over a channel bandwidth of 4.32 Gigahertz (GHz), 6.48 GHz, or 8.64 GHz.

Example 45 includes a product comprising one or more tangible computer-readable non-transitory storage media comprising computer-executable instructions operable to, when executed by at least one processor, enable the at least one processor to cause an Enhanced Directional Multi-Gigabit (EDMG) initiator station (STA) of a Beam Refinement Protocol (BRP) Transmit (TX) Sector Sweep (SS) (TXSS) to, during an initiator BRP TXSS, transmit one or more initiator EDMG BRP-TX packets to an EDMG responder STA, transmission of an initiator EDMG BRP-TX packet of the one or more initiator EDMG BRP-TX packets comprising a SS of at least one antenna of the EDMG initiator STA over a Training (TRN) field of the initiator EDMG BRP-TX packet; during a responder BRP TXSS following the initiator BRP TXSS, receive one or more responder EDMG BRP-TX packets from the EDMG responder STA; and transmit to the EDMG responder STA a BRP frame comprising feedback based on measurements on the one or more responder EDMG BRP-TX packets.

Example 46 includes the subject matter of Example 45, and optionally, wherein the instructions, when executed, cause the EDMG initiator STA to transmit to the EDMG responder STA a setup BRP frame comprising an EDMG BRP request element to initiate the BRP TXSS, the EDMG BRP request element comprising a TXSS Multiple Input Multiple Output (MIMO) (TXSS-MIMO) field comprising a value to indicate whether the BRP TXSS is a Single Input Single Output (SISO) BRP TXSS or a MIMO BRP TXSS.

Example 47 includes the subject matter of Example 46, and optionally, wherein the instructions, when executed, cause the EDMG initiator STA to set the TXSS-MIMO field to a value of zero to indicate that the BRP TXSS is the SISO BRP TXSS in which the EDMG initiator STA is to transmit the one or more initiator EDMG BRP-TX packets using a single transmit chain.

Example 48 includes the subject matter of Example 46, and optionally, wherein the instructions, when executed, cause the EDMG initiator STA to set the TXSS-MIMO field to a value of one to indicate that the BRP TXSS is the MIMO BRP TXSS in which the EDMG initiator STA is to transmit the one or more initiator EDMG BRP-TX packets using multiple transmit chains.

Example 49 includes the subject matter of Example 48, and optionally, wherein the TRN field of the initiator EDMG BRP-TX packet comprises a plurality of orthogonal waveforms, a count of the plurality of orthogonal waveforms is based on a count of a plurality of transmit chains to transmit the initiator EDMG BRP-TX packet.

Example 50 includes the subject matter of Example 48 or 49, and optionally, wherein the instructions, when executed, cause the EDMG initiator STA to set for the one or more initiator EDMG BRP-TX packets a value of a TXVECTOR parameter EDMG_TRN_LEN to k, wherein k denotes a count of TRN units to be used in transmit training.

Example 51 includes the subject matter of any one of Examples 48-50, and optionally, wherein the instructions, when executed, cause the EDMG initiator STA to set to 1 a TRN-Unit Receive (RX) pattern field in an EDMG Header A of the initiator EDMG BRP-TX packet.

Example 52 includes the subject matter of any one of Examples 45-51, and optionally, wherein the instructions, when executed, cause the EDMG initiator STA to transmit to the EDMG responder STA a setup BRP frame comprising an EDMG BRP request element to initiate the BRP TXSS, a field in the EDMG BRP request element to indicate that the BRP TXSS is to include the responder BRP TXSS.

Example 53 includes the subject matter of any one of Examples 45-52, and optionally, wherein the instructions, when executed, cause the EDMG initiator STA to transmit the BRP frame comprising the feedback using a same antenna configuration as an antenna configuration for transmission of a setup BRP frame comprising an EDMG BRP request element to initiate the BRP TXSS.

Example 54 includes the subject matter of any one of Examples 45-53, and optionally, wherein the instructions, when executed, cause the EDMG initiator STA to begin the responder BRP TXSS a Medium Beamforming Inter-Frame Space (MBIFS) after the initiator BRP TXSS.

Example 55 includes the subject matter of any one of Examples 45-54, and optionally, wherein the instructions, when executed, cause the EDMG initiator STA to repeat transmission of the one or more initiator EDMG BRP-TX packets based on a count of antennas of the EDMG responder STA.

Example 56 includes the subject matter of any one of Examples 45-55, and optionally, wherein the instructions, when executed, cause the EDMG initiator STA to receive from the EDMG responder STA a responder BRP frame comprising feedback based on measurements on the one or more initiator EDMG BRP-TX packets.

Example 57 includes the subject matter of any one of Examples 45-56, and optionally, wherein the instructions, when executed, cause the EDMG initiator STA to transmit the one or more initiator EDMG BRP-TX packets over a channel bandwidth in a frequency band above 45 Gigahertz (GHz).

Example 58 includes the subject matter of any one of Examples 45-57, and optionally, wherein the instructions, when executed, cause the EDMG initiator STA to transmit the one or more initiator EDMG BRP-TX packets over a channel bandwidth of 4.32 Gigahertz (GHz), 6.48 GHz, or 8.64 GHz.

Example 59 includes an apparatus of wireless communication by an Enhanced Directional Multi-Gigabit (EDMG) initiator station (STA) of a Beam Refinement Protocol (BRP) Transmit (TX) Sector Sweep (SS) (TXSS), the apparatus comprising means for, during an initiator BRP TXSS, transmitting one or more initiator EDMG BRP-TX packets to an EDMG responder STA, transmission of an initiator EDMG BRP-TX packet of the one or more initiator EDMG BRP-TX packets comprising a SS of at least one antenna of the EDMG initiator STA over a Training (TRN) field of the initiator EDMG BRP-TX packet; means for, during a responder BRP TXSS following the initiator BRP TXSS, receiving one or more responder EDMG BRP-TX packets from the EDMG responder STA; and means for transmitting to the EDMG responder STA a BRP frame comprising feedback based on measurements on the one or more responder EDMG BRP-TX packets.

Example 60 includes the subject matter of Example 59, and optionally, comprising means for transmitting to the EDMG responder STA a setup BRP frame comprising an EDMG BRP request element to initiate the BRP TXSS, the EDMG BRP request element comprising a TXSS Multiple Input Multiple Output (MIMO) (TXSS-MIMO) field comprising a value to indicate whether the BRP TXSS is a Single Input Single Output (SISO) BRP TXSS or a MIMO BRP TXSS.

Example 61 includes the subject matter of Example 60, and optionally, comprising means for setting the TXSS-MIMO field to a value of zero to indicate that the BRP TXSS is the SISO BRP TXSS in which the EDMG initiator STA is to transmit the one or more initiator EDMG BRP-TX packets using a single transmit chain.

Example 62 includes the subject matter of Example 60, and optionally, comprising means for setting the TXSS-MIMO field to a value of one to indicate that the BRP TXSS is the MIMO BRP TXSS in which the EDMG initiator STA is to transmit the one or more initiator EDMG BRP-TX packets using multiple transmit chains.

Example 63 includes the subject matter of Example 62, and optionally, wherein the TRN field of the initiator EDMG BRP-TX packet comprises a plurality of orthogonal waveforms, a count of the plurality of orthogonal waveforms is based on a count of a plurality of transmit chains to transmit the initiator EDMG BRP-TX packet.

Example 64 includes the subject matter of Example 62 or 63, and optionally, comprising means for setting for the one or more initiator EDMG BRP-TX packets a value of a TXVECTOR parameter EDMG_TRN_LEN to k, wherein k denotes a count of TRN units to be used in transmit training.

Example 65 includes the subject matter of any one of Examples 62-64, and optionally, comprising means for setting to 1 a TRN-Unit Receive (RX) pattern field in an EDMG Header A of the initiator EDMG BRP-TX packet.

Example 66 includes the subject matter of any one of Examples 59-65, and optionally, comprising means for transmitting to the EDMG responder STA a setup BRP frame comprising an EDMG BRP request element to initiate the BRP TXSS, a field in the EDMG BRP request element to indicate that the BRP TXSS is to include the responder BRP TXSS.

Example 67 includes the subject matter of any one of Examples 59-66, and optionally, comprising means for transmitting the BRP frame comprising the feedback using a same antenna configuration as an antenna configuration for transmission of a setup BRP frame comprising an EDMG BRP request element to initiate the BRP TXSS.

Example 68 includes the subject matter of any one of Examples 59-67, and optionally, comprising means for beginning the responder BRP TXSS a Medium Beamforming Inter-Frame Space (MBIFS) after the initiator BRP TXSS.

Example 69 includes the subject matter of any one of Examples 59-68, and optionally, comprising means for repeating transmission of the one or more initiator EDMG BRP-TX packets based on a count of antennas of the EDMG responder STA.

Example 70 includes the subject matter of any one of Examples 59-69, and optionally, comprising means for receiving from the EDMG responder STA a responder BRP frame comprising feedback based on measurements on the one or more initiator EDMG BRP-TX packets.

Example 71 includes the subject matter of any one of Examples 59-70, and optionally, comprising means for transmitting the one or more initiator EDMG BRP-TX packets over a channel bandwidth in a frequency band above 45 Gigahertz (GHz).

Example 72 includes the subject matter of any one of Examples 59-71, and optionally, comprising means for transmitting the one or more initiator EDMG BRP-TX packets over a channel bandwidth of 4.32 Gigahertz (GHz), 6.48 GHz, or 8.64 GHz.

Example 73 includes an apparatus comprising logic and circuitry configured to cause an Enhanced Directional Multi-Gigabit (EDMG) responder station (STA) of a Beam Refinement Protocol (BRP) Transmit (TX) Sector Sweep (SS) (TXSS) to, during an initiator BRP TXSS, receive one or more initiator EDMG BRP-TX packets from an EDMG initiator STA; during a responder BRP TXSS following the initiator BRP TXSS, transmit one or more responder EDMG BRP-TX packets to the EDMG initiator STA, transmission of a responder EDMG BRP-TX packet of the one or more responder EDMG BRP-TX packets comprising a SS of at least one antenna of the EDMG responder STA over a Training (TRN) field of the responder EDMG BRP-TX packet; and receive from the EDMG initiator STA a BRP frame comprising feedback based on measurements on the one or more responder EDMG BRP-TX packets.

Example 74 includes the subject matter of Example 73, and optionally, wherein the apparatus is configured to cause the EDMG responder STA to receive from the EDMG initiator STA a setup BRP frame comprising an EDMG BRP request element to initiate the BRP TXSS, the EDMG BRP request element comprising a TXSS Multiple Input Multiple Output (MIMO) (TXSS-MIMO) field comprising a value to indicate whether the BRP TXSS is a Single Input Single Output (SISO) BRP TXSS or a MIMO BRP TXSS.

Example 75 includes the subject matter of Example 74, and optionally, wherein the apparatus is configured to cause the EDMG responder STA to, when the TXSS-MIMO field comprises a value of zero, determine that the BRP TXSS is the SISO BRP TXSS in which the EDMG responder STA is to transmit the one or more responder EDMG BRP-TX packets using a single transmit chain.

Example 76 includes the subject matter of Example 74, and optionally, wherein the apparatus is configured to cause the EDMG responder STA to, when the TXSS-MIMO field comprises a value of one, determine that the BRP TXSS is the MIMO BRP TXSS in which the EDMG responder STA is to transmit the one or more responder EDMG BRP-TX packets using multiple transmit chains.

Example 77 includes the subject matter of Example 76, and optionally, wherein the TRN field of the responder EDMG BRP-TX packet comprises a plurality of orthogonal waveforms, a count of the plurality of orthogonal waveforms is based on a count of a plurality of transmit chains to transmit the responder EDMG BRP-TX packet.

Example 78 includes the subject matter of Example 76 or 77, and optionally, wherein the apparatus is configured to cause the EDMG responder STA to set for the one or more responder EDMG BRP-TX packets a value of a TXVECTOR parameter EDMG_TRN_LEN to k, wherein k denotes a count of TRN units to be used in transmit training.

Example 79 includes the subject matter of any one of Examples 76-78, and optionally, wherein the apparatus is configured to cause the EDMG responder STA to set to 1 a TRN-Unit Receive (RX) pattern field in an EDMG Header A of the responder EDMG BRP-TX packet.

Example 80 includes the subject matter of any one of Examples 73-79, and optionally, wherein the apparatus is configured to cause the EDMG responder STA to receive from the EDMG initiator STA a setup BRP frame comprising an EDMG BRP request element to initiate the BRP TXSS, and to determine based on a field in the EDMG BRP request element that the BRP TXSS is to include the responder BRP TXSS.

Example 81 includes the subject matter of any one of Examples 73-80, and optionally, wherein the apparatus is configured to cause the EDMG responder STA to transmit to the EDMG initiator STA a responder BRP frame comprising feedback based on measurements on the one or more initiator EDMG BRP-TX packets.

Example 82 includes the subject matter of Example 81, and optionally, wherein the apparatus is configured to cause the EDMG responder STA to transmit the responder BRP frame using a same antenna configuration as an antenna configuration for transmission of a setup BRP frame to the EDMG initiator STA.

Example 83 includes the subject matter of any one of Examples 73-82, and optionally, wherein the apparatus is configured to cause the EDMG responder STA to begin the responder BRP TXSS a Medium Beamforming Inter-Frame Space (MBIFS) after the initiator BRP TXSS.

Example 84 includes the subject matter of any one of Examples 73-83, and optionally, wherein the apparatus is configured to cause the EDMG responder STA to repeat transmission of the one or more responder EDMG BRP-TX packets based on a count of antennas of the EDMG initiator STA.

Example 85 includes the subject matter of any one of Examples 73-84, and optionally, wherein the apparatus is configured to cause the EDMG responder STA to transmit the one or more responder EDMG BRP-TX packets over a channel bandwidth in a frequency band above 45 Gigahertz (GHz).

Example 86 includes the subject matter of any one of Examples 73-85, and optionally, wherein the apparatus is configured to cause the EDMG responder STA to transmit the one or more responder EDMG BRP-TX packets over a channel bandwidth of 4.32 Gigahertz (GHz), 6.48 GHz, or 8.64 GHz.

Example 87 includes the subject matter of any one of Examples 73-86, and optionally, comprising a radio to transmit the one or more responder EDMG BRP-TX packets.

Example 88 includes the subject matter of any one of Examples 73-87, and optionally, comprising a plurality of antennas, a memory, and a processor.

Example 89 includes a system of wireless communication comprising an Enhanced Directional Multi-Gigabit (EDMG) responder station (STA) of a Beam Refinement Protocol (BRP) Transmit (TX) Sector Sweep (SS) (TXSS), the EDMG responder STA comprising a plurality of antennas; a radio; a memory; a processor; and a controller configured to cause the EDMG responder STA to, during an initiator BRP TXSS, receive one or more initiator EDMG BRP-TX packets from an EDMG initiator STA; during a responder BRP TXSS following the initiator BRP TXSS, transmit one or more responder EDMG BRP-TX packets to the EDMG initiator STA, transmission of a responder EDMG BRP-TX packet of the one or more responder EDMG BRP-TX packets comprising a SS of at least one antenna of the EDMG responder STA over a Training (TRN) field of the responder EDMG BRP-TX packet; and receive from the EDMG initiator STA a BRP frame comprising feedback based on measurements on the one or more responder EDMG BRP-TX packets.

Example 90 includes the subject matter of Example 89, and optionally, wherein the controller is configured to cause the EDMG responder STA to receive from the EDMG initiator STA a setup BRP frame comprising an EDMG BRP request element to initiate the BRP TXSS, the EDMG BRP request element comprising a TXSS Multiple Input Multiple Output (MIMO) (TXSS-MIMO) field comprising a value to indicate whether the BRP TXSS is a Single Input Single Output (SISO) BRP TXSS or a MIMO BRP TXSS.

Example 91 includes the subject matter of Example 90, and optionally, wherein the controller is configured to cause the EDMG responder STA to, when the TXSS-MIMO field comprises a value of zero, determine that the BRP TXSS is the SISO BRP TXSS in which the EDMG responder STA is to transmit the one or more responder EDMG BRP-TX packets using a single transmit chain.

Example 92 includes the subject matter of Example 90, and optionally, wherein the controller is configured to cause the EDMG responder STA to, when the TXSS-MIMO field comprises a value of one, determine that the BRP TXSS is the MIMO BRP TXSS in which the EDMG responder STA is to transmit the one or more responder EDMG BRP-TX packets using multiple transmit chains.

Example 93 includes the subject matter of Example 92, and optionally, wherein the TRN field of the responder EDMG BRP-TX packet comprises a plurality of orthogonal waveforms, a count of the plurality of orthogonal waveforms is based on a count of a plurality of transmit chains to transmit the responder EDMG BRP-TX packet.

Example 94 includes the subject matter of Example 92 or 93, and optionally, wherein the controller is configured to cause the EDMG responder STA to set for the one or more responder EDMG BRP-TX packets a value of a TXVECTOR parameter EDMG_TRN_LEN to k, wherein k denotes a count of TRN units to be used in transmit training.

Example 95 includes the subject matter of any one of Examples 92-94, and optionally, wherein the controller is configured to cause the EDMG responder STA to set to 1 a TRN-Unit Receive (RX) pattern field in an EDMG Header A of the responder EDMG BRP-TX packet.

Example 96 includes the subject matter of any one of Examples 89-95, and optionally, wherein the controller is configured to cause the EDMG responder STA to receive from the EDMG initiator STA a setup BRP frame comprising an EDMG BRP request element to initiate the BRP TXSS, and to determine based on a field in the EDMG BRP request element that the BRP TXSS is to include the responder BRP TXSS.

Example 97 includes the subject matter of any one of Examples 89-96, and optionally, wherein the controller is configured to cause the EDMG responder STA to transmit to the EDMG initiator STA a responder BRP frame comprising feedback based on measurements on the one or more initiator EDMG BRP-TX packets.

Example 98 includes the subject matter of Example 97, and optionally, wherein the controller is configured to cause the EDMG responder STA to transmit the responder BRP frame using a same antenna configuration as an antenna configuration for transmission of a setup BRP frame to the EDMG initiator STA.

Example 99 includes the subject matter of any one of Examples 89-98, and optionally, wherein the controller is configured to cause the EDMG responder STA to begin the responder BRP TXSS a Medium Beamforming Inter-Frame Space (MBIFS) after the initiator BRP TXSS.

Example 100 includes the subject matter of any one of Examples 89-99, and optionally, wherein the controller is configured to cause the EDMG responder STA to repeat transmission of the one or more responder EDMG BRP-TX packets based on a count of antennas of the EDMG initiator STA.

Example 101 includes the subject matter of any one of Examples 89-100, and optionally, wherein the controller is configured to cause the EDMG responder STA to transmit the one or more responder EDMG BRP-TX packets over a channel bandwidth in a frequency band above 45 Gigahertz (GHz).

Example 102 includes the subject matter of any one of Examples 89-101, and optionally, wherein the controller is configured to cause the EDMG responder STA to transmit the one or more responder EDMG BRP-TX packets over a channel bandwidth of 4.32 Gigahertz (GHz), 6.48 GHz, or 8.64 GHz.

Example 103 includes a method to be performed at an Enhanced Directional Multi-Gigabit (EDMG) responder station (STA) of a Beam Refinement Protocol (BRP) Transmit (TX) Sector Sweep (SS) (TXSS), the method comprising, during an initiator BRP TXSS, receiving one or more initiator EDMG BRP-TX packets from an EDMG initiator STA; during a responder BRP TXSS following the initiator BRP TXSS, transmitting one or more responder EDMG BRP-TX packets to the EDMG initiator STA, transmission of a responder EDMG BRP-TX packet of the one or more responder EDMG BRP-TX packets comprising a SS of at least one antenna of the EDMG responder STA over a Training (TRN) field of the responder EDMG BRP-TX packet; and receiving from the EDMG initiator STA a BRP frame comprising feedback based on measurements on the one or more responder EDMG BRP-TX packets.

Example 104 includes the subject matter of Example 103, and optionally, comprising receiving from the EDMG initiator STA a setup BRP frame comprising an EDMG BRP request element to initiate the BRP TXSS, the EDMG BRP request element comprising a TXSS Multiple Input Multiple Output (MIMO) (TXSS-MIMO) field comprising a value to indicate whether the BRP TXSS is a Single Input Single Output (SISO) BRP TXSS or a MIMO BRP TXSS.

Example 105 includes the subject matter of Example 104, and optionally, comprising, when the TXSS-MIMO field comprises a value of zero, determining that the BRP TXSS is the SISO BRP TXSS in which the EDMG responder STA is to transmit the one or more responder EDMG BRP-TX packets using a single transmit chain.

Example 106 includes the subject matter of Example 104, and optionally, comprising, when the TXSS-MIMO field comprises a value of one, determining that the BRP TXSS is the MIMO BRP TXSS in which the EDMG responder STA is to transmit the one or more responder EDMG BRP-TX packets using multiple transmit chains.

Example 107 includes the subject matter of Example 106, and optionally, wherein the TRN field of the responder EDMG BRP-TX packet comprises a plurality of orthogonal waveforms, a count of the plurality of orthogonal waveforms is based on a count of a plurality of transmit chains to transmit the responder EDMG BRP-TX packet.

Example 108 includes the subject matter of Example 106 or 107, and optionally, comprising setting for the one or more responder EDMG BRP-TX packets a value of a TXVECTOR parameter EDMG_TRN_LEN to k, wherein k denotes a count of TRN units to be used in transmit training.

Example 109 includes the subject matter of any one of Examples 106-108, and optionally, comprising setting to 1 a TRN-Unit Receive (RX) pattern field in an EDMG Header A of the responder EDMG BRP-TX packet.

Example 110 includes the subject matter of any one of Examples 103-109, and optionally, comprising receiving from the EDMG initiator STA a setup BRP frame comprising an EDMG BRP request element to initiate the BRP TXSS, and determining based on a field in the EDMG BRP request element that the BRP TXSS is to include the responder BRP TXSS.

Example 111 includes the subject matter of any one of Examples 103-110, and optionally, comprising transmitting to the EDMG initiator STA a responder BRP frame comprising feedback based on measurements on the one or more initiator EDMG BRP-TX packets.

Example 112 includes the subject matter of Example 111, and optionally, comprising transmitting the responder BRP frame using a same antenna configuration as an antenna configuration for transmission of a setup BRP frame to the EDMG initiator STA.

Example 113 includes the subject matter of any one of Examples 103-112, and optionally, comprising beginning the responder BRP TXSS a Medium Beamforming Inter-Frame Space (MBIFS) after the initiator BRP TXSS.

Example 114 includes the subject matter of any one of Examples 103-113, and optionally, comprising repeating transmission of the one or more responder EDMG BRP-TX packets based on a count of antennas of the EDMG initiator STA.

Example 115 includes the subject matter of any one of Examples 103-114, and optionally, comprising transmitting the one or more responder EDMG BRP-TX packets over a channel bandwidth in a frequency band above 45 Gigahertz (GHz).

Example 116 includes the subject matter of any one of Examples 103-115, and optionally, comprising transmitting the one or more responder EDMG BRP-TX packets over a channel bandwidth of 4.32 Gigahertz (GHz), 6.48 GHz, or 8.64 GHz.

Example 117 includes a product comprising one or more tangible computer-readable non-transitory storage media comprising computer-executable instructions operable to, when executed by at least one processor, enable the at least one processor to cause an Enhanced Directional Multi-Gigabit (EDMG) responder station (STA) of a Beam Refinement Protocol (BRP) Transmit (TX) Sector Sweep (SS) (TXSS) to, during an initiator BRP TXSS, receive one or more initiator EDMG BRP-TX packets from an EDMG initiator STA; during a responder BRP TXSS following the initiator BRP TXSS, transmit one or more responder EDMG BRP-TX packets to the EDMG initiator STA, transmission of a responder EDMG BRP-TX packet of the one or more responder EDMG BRP-TX packets comprising a SS of at least one antenna of the EDMG responder STA over a Training (TRN) field of the responder EDMG BRP-TX packet; and receive from the EDMG initiator STA a BRP frame comprising feedback based on measurements on the one or more responder EDMG BRP-TX packets.

Example 118 includes the subject matter of Example 117, and optionally, wherein the instructions, when executed, cause the EDMG responder STA to receive from the EDMG initiator STA a setup BRP frame comprising an EDMG BRP request element to initiate the BRP TXSS, the EDMG BRP request element comprising a TXSS Multiple Input Multiple Output (MIMO) (TXSS-MIMO) field comprising a value to indicate whether the BRP TXSS is a Single Input Single Output (SISO) BRP TXSS or a MIMO BRP TXSS.

Example 119 includes the subject matter of Example 118, and optionally, wherein the instructions, when executed, cause the EDMG responder STA to, when the TXSS-MIMO field comprises a value of zero, determine that the BRP TXSS is the SISO BRP TXSS in which the EDMG responder STA is to transmit the one or more responder EDMG BRP-TX packets using a single transmit chain.

Example 120 includes the subject matter of Example 118, and optionally, wherein the instructions, when executed, cause the EDMG responder STA to, when the TXSS-MIMO field comprises a value of one, determine that the BRP TXSS is the MIMO BRP TXSS in which the EDMG responder STA is to transmit the one or more responder EDMG BRP-TX packets using multiple transmit chains.

Example 121 includes the subject matter of Example 120, and optionally, wherein the TRN field of the responder EDMG BRP-TX packet comprises a plurality of orthogonal waveforms, a count of the plurality of orthogonal waveforms is based on a count of a plurality of transmit chains to transmit the responder EDMG BRP-TX packet.

Example 122 includes the subject matter of Example 120 or 121, and optionally, wherein the instructions, when executed, cause the EDMG responder STA to set for the one or more responder EDMG BRP-TX packets a value of a TXVECTOR parameter EDMG_TRN_LEN to k, wherein k denotes a count of TRN units to be used in transmit training.

Example 123 includes the subject matter of any one of Examples 120-122, and optionally, wherein the instructions, when executed, cause the EDMG responder STA to set to 1 a TRN-Unit Receive (RX) pattern field in an EDMG Header A of the responder EDMG BRP-TX packet.

Example 124 includes the subject matter of any one of Examples 117-123, and optionally, wherein the instructions, when executed, cause the EDMG responder STA to receive from the EDMG initiator STA a setup BRP frame comprising an EDMG BRP request element to initiate the BRP TXSS, and to determine based on a field in the EDMG BRP request element that the BRP TXSS is to include the responder BRP TXSS.

Example 125 includes the subject matter of any one of Examples 117-124, and optionally, wherein the instructions, when executed, cause the EDMG responder STA to transmit to the EDMG initiator STA a responder BRP frame comprising feedback based on measurements on the one or more initiator EDMG BRP-TX packets.

Example 126 includes the subject matter of Example 125, and optionally, wherein the instructions, when executed, cause the EDMG responder STA to transmit the responder BRP frame using a same antenna configuration as an antenna configuration for transmission of a setup BRP frame to the EDMG initiator STA.

Example 127 includes the subject matter of any one of Examples 117-126, and optionally, wherein the instructions, when executed, cause the EDMG responder STA to begin the responder BRP TXSS a Medium Beamforming Inter-Frame Space (MBIFS) after the initiator BRP TXSS.

Example 128 includes the subject matter of any one of Examples 117-127, and optionally, wherein the instructions, when executed, cause the EDMG responder STA to repeat transmission of the one or more responder EDMG BRP-TX packets based on a count of antennas of the EDMG initiator STA.

Example 129 includes the subject matter of any one of Examples 117-128, and optionally, wherein the instructions, when executed, cause the EDMG responder STA to transmit the one or more responder EDMG BRP-TX packets over a channel bandwidth in a frequency band above 45 Gigahertz (GHz).

Example 130 includes the subject matter of any one of Examples 117-129, and optionally, wherein the instructions, when executed, cause the EDMG responder STA to transmit the one or more responder EDMG BRP-TX packets over a channel bandwidth of 4.32 Gigahertz (GHz), 6.48 GHz, or 8.64 GHz.

Example 131 includes an apparatus of wireless communication by an Enhanced Directional Multi-Gigabit (EDMG) responder station (STA) of a Beam Refinement Protocol (BRP) Transmit (TX) Sector Sweep (SS) (TXSS), the apparatus comprising means for, during an initiator BRP TXSS, receiving one or more initiator EDMG BRP-TX packets from an EDMG initiator STA; means for, during a responder BRP TXSS following the initiator BRP TXSS, transmitting one or more responder EDMG BRP-TX packets to the EDMG initiator STA, transmission of a responder EDMG BRP-TX packet of the one or more responder EDMG BRP-TX packets comprising a SS of at least one antenna of the EDMG responder STA over a Training (TRN) field of the responder EDMG BRP-TX packet; and means for receiving from the EDMG initiator STA a BRP frame comprising feedback based on measurements on the one or more responder EDMG BRP-TX packets.

Example 132 includes the subject matter of Example 131, and optionally, comprising means for receiving from the EDMG initiator STA a setup BRP frame comprising an EDMG BRP request element to initiate the BRP TXSS, the EDMG BRP request element comprising a TXSS Multiple Input Multiple Output (MIMO) (TXSS-MIMO) field comprising a value to indicate whether the BRP TXSS is a Single Input Single Output (SISO) BRP TXSS or a MIMO BRP TXSS.

Example 133 includes the subject matter of Example 132, and optionally, comprising means for, when the TXSS-MIMO field comprises a value of zero, determining that the BRP TXSS is the SISO BRP TXSS in which the EDMG responder STA is to transmit the one or more responder EDMG BRP-TX packets using a single transmit chain.

Example 134 includes the subject matter of Example 132, and optionally, comprising means for, when the TXSS-MIMO field comprises a value of one, determining that the BRP TXSS is the MIMO BRP TXSS in which the EDMG responder STA is to transmit the one or more responder EDMG BRP-TX packets using multiple transmit chains.

Example 135 includes the subject matter of Example 134, and optionally, wherein the TRN field of the responder EDMG BRP-TX packet comprises a plurality of orthogonal waveforms, a count of the plurality of orthogonal waveforms is based on a count of a plurality of transmit chains to transmit the responder EDMG BRP-TX packet.

Example 136 includes the subject matter of Example 134 or 135, and optionally, comprising means for setting for the one or more responder EDMG BRP-TX packets a value of a TXVECTOR parameter EDMG_TRN_LEN to k, wherein k denotes a count of TRN units to be used in transmit training.

Example 137 includes the subject matter of any one of Examples 134-136, and optionally, comprising means for setting to 1 a TRN-Unit Receive (RX) pattern field in an EDMG Header A of the responder EDMG BRP-TX packet.

Example 138 includes the subject matter of any one of Examples 131-137, and optionally, comprising means for receiving from the EDMG initiator STA a setup BRP frame comprising an EDMG BRP request element to initiate the BRP TXSS, and determining based on a field in the EDMG BRP request element that the BRP TXSS is to include the responder BRP TXSS.

Example 139 includes the subject matter of any one of Examples 131-138, and optionally, comprising means for transmitting to the EDMG initiator STA a responder BRP frame comprising feedback based on measurements on the one or more initiator EDMG BRP-TX packets.

Example 140 includes the subject matter of Example 139, and optionally, comprising means for transmitting the responder BRP frame using a same antenna configuration as an antenna configuration for transmission of a setup BRP frame to the EDMG initiator STA.

Example 141 includes the subject matter of any one of Examples 131-140, and optionally, comprising means for beginning the responder BRP TXSS a Medium Beamforming Inter-Frame Space (MBIFS) after the initiator BRP TXSS.

Example 142 includes the subject matter of any one of Examples 131-141, and optionally, comprising means for repeating transmission of the one or more responder EDMG BRP-TX packets based on a count of antennas of the EDMG initiator STA.

Example 143 includes the subject matter of any one of Examples 131-142, and optionally, comprising means for transmitting the one or more responder EDMG BRP-TX packets over a channel bandwidth in a frequency band above 45 Gigahertz (GHz).

Example 144 includes the subject matter of any one of Examples 131-143, and optionally, comprising means for transmitting the one or more responder EDMG BRP-TX packets over a channel bandwidth of 4.32 Gigahertz (GHz), 6.48 GHz, or 8.64 GHz.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
   a processor comprising logic and circuitry configured to cause an initiator station (STA) of a Beam Refinement Protocol (BRP) Transmit (TX) Sector Sweep (TXSS) procedure to:
   transmit a first BRP frame to initiate the BRP TXSS procedure with a responder STA, the first BRP frame comprising an Enhanced Directional Multi-Gigabit (EDMG) BRP request element comprising a TXSS Multiple Input Multiple Output (MIMO) (TXSS- MIMO) field to indicate whether the BRP TXSS procedure is a Single Input Single Output (SISO) BRP TXSS procedure or a MIMO BRP TXSS procedure;

process a second BRP frame from the responder STA, the second BRP frame in response to the first BRP frame, the second BRP frame to confirm the BRP TXSS procedure; and in accordance with the TXSS-MIMO field, perform an initiator BRP TXSS of the SISO BRP TXSS procedure or an initiator BRP TXSS of the MIMO BRP TXSS procedure, wherein the initiator BRP TXSS of the SISO BRP TXSS procedure comprises transmission of one or more EDMG BRP-TX packets to the responder STA via a single transmit chain, wherein the initiator BRP TXSS of the MIMO BRP TXSS procedure comprises transmission of the one or more EDMG BRP-TX packets to the responder STA via multiple transmit chains; and a memory to store information processed by the processor.

2. The apparatus of claim 1 configured to cause the initiator STA to set the TXSS-MIMO field to a value "0" or a value "1", the value "0" to indicate that the BRP TXSS procedure is the SISO BRP TXSS procedure, the value "1" to indicate that the BRP TXSS procedure is the MIMO BRP TXSS procedure.

3. The apparatus of claim 1 configured to cause the initiator STA to set the TXSS-MIMO field to a value "1" to indicate that the BRP TXSS procedure is the MIMO BRP TXSS procedure, and to perform the initiator BRP TXSS of the MIMO BRP TXSS procedure by transmitting the one or more EDMG BRP-TX packets via the multiple transmit chains.

4. The apparatus of claim 3, wherein a Training (TRN) field of the one or more EDMG BRP-TX packets comprises a plurality of orthogonal waveforms, a count of the plurality of orthogonal waveforms is based on a count of the multiple transmit chains.

5. The apparatus of claim 3 configured to cause the initiator STA to set a TXVECTOR parameter EDMG_TRN_LEN for the EDMG BRP-TX packets to a value, which is based on a count of Training (TRN) units for transmit training.

6. The apparatus of claim 3 configured to cause the initiator STA to set to "1" a TRN-Unit Receive (RX) pattern field in an EDMG Header A of the EDMG BRP-TX packets.

7. The apparatus of claim 1 configured to cause the initiator STA to:

during a responder BRP TXSS of the BRP TXSS procedure, receive one or more EDMG BRP-TX packets from the responder STA; and transmit a BRP feedback frame to the responder STA, the BRP feedback frame comprising feedback based on measurements on the one or more EDMG BRP-TX packets from the responder STA.

8. The apparatus of claim 7 configured to cause the initiator STA to transmit the BRP feedback frame using a same antenna configuration as an antenna configuration for transmission of the first BRP frame.

9. The apparatus of claim 7 configured to cause the initiator STA to begin the responder BRP TXSS a Medium Beamforming Inter-Frame Space (MBIFS) after the initiator BRP TXSS.

10. The apparatus of claim 1 configured to cause the initiator STA to set the TXSS-MIMO field to a value "0" to indicate that the BRP TXSS procedure is the SISO BRP TXSS procedure, and to perform the initiator BRP TXSS of the SISO BRP TXSS procedure by transmitting the one or more EDMG BRP-TX packets via the single transmit chain.

11. The apparatus of claim 1 configured to cause the initiator STA to process a BRP feedback frame from the responder STA, the BRP feedback frame from the responder STA comprising feedback based on measurements on the one or more EDMG BRP-TX packets.

12. The apparatus of claim 1 configured to cause the initiator STA to transmit the first BRP frame, and the one or more EDMG BRP-TX packets over a channel bandwidth of at least 2.16 Gigahertz (GHZ) in a frequency band above 45 Gigahertz (GHz).

13. The apparatus of claim 1 configured to cause the initiator STA to transmit the first BRP frame, and the one or more EDMG BRP-TX packets over a channel bandwidth of 4.32 Gigahertz (GHz), 6.48 GHz, or 8.64 GHz.

14. The apparatus of claim 1 comprising a radio, the processor configured to cause the radio to transmit the first BRP frame and the one or more EDMG BRP-TX packets.

15. The apparatus of claim 14 comprising one or more antennas connected to the radio, and another processor to execute instructions of an operating system.

16. A product comprising one or more tangible computer-readable non-transitory storage media comprising computer-executable instructions operable to, when executed by at least one processor, enable the at least one processor to cause an initiator station (STA) of a Beam Refinement Protocol (BRP) Transmit (TX) Sector Sweep (TXSS) procedure to:

transmit a first BRP frame to initiate the BRP TXSS procedure with a responder STA, the first BRP frame comprising an Enhanced Directional Multi-Gigabit (EDMG) BRP request element comprising a TXSS Multiple Input Multiple Output (MIMO) (TXSS-MIMO) field to indicate whether the BRP TXSS procedure is a Single Input Single Output (SISO) BRP TXSS procedure or a MIMO BRP TXSS procedure;

process a second BRP frame from the responder STA, the second BRP frame in response to the first BRP frame, the second BRP frame to confirm the BRP TXSS procedure; and in accordance with the TXSS-MIMO field, perform an initiator BRP TXSS of the SISO BRP TXSS procedure or an initiator BRP TXSS of the MIMO BRP TXSS procedure, wherein the initiator BRP TXSS of the SISO BRP TXSS procedure comprises transmission of one or more EDMG BRP-TX packets to the responder STA via a single transmit chain, wherein the initiator BRP TXSS of the MIMO BRP TXSS procedure comprises transmission of the one or more EDMG BRP-TX packets to the responder STA via multiple transmit chains.

17. The product of claim 16, wherein the instructions, when executed, cause the initiator STA to set the TXSS-MIMO field to a value "0" or a value "1", the value "0" to indicate that the BRP TXSS procedure is the SISO BRP TXSS procedure, the value "1" to indicate that the BRP TXSS procedure is the MIMO BRP TXSS procedure.

18. The product of claim 16, wherein the instructions, when executed, cause the initiator STA to set the TXSS-MIMO field to a value "1" to indicate that the BRP TXSS procedure is the MIMO BRP TXSS procedure, and to perform the initiator BRP TXSS of the MIMO BRP TXSS procedure by transmitting the one or more EDMG BRP-TX packets via the multiple transmit chains.

19. The product of claim 18, wherein a Training (TRN) field of the one or more EDMG BRP-TX packets comprises a plurality of orthogonal waveforms, a count of the plurality of orthogonal waveforms is based on a count of the multiple transmit chains.

20. The product of claim 18, wherein the instructions, when executed, cause the initiator STA to set a TXVECTOR parameter EDMG_TRN_LEN for the EDMG BRP-TX packets to a value, which is based on a count of Training (TRN) units for transmit training.

21. The product of claim 16, wherein the instructions, when executed, cause the initiator STA to:
   during a responder BRP TXSS of the BRP TXSS procedure, receive one or more EDMG BRP-TX packets from the responder STA; and
   transmit a BRP feedback frame to the responder STA, the BRP feedback frame comprising feedback based on measurements on the one or more EDMG BRP-TX packets from the responder STA.

22. The product of claim 21, wherein the instructions, when executed, cause the initiator STA to transmit the BRP feedback frame using a same antenna configuration as an antenna configuration for transmission of the first BRP frame.

23. The product of claim 21, wherein the instructions, when executed, cause the initiator STA to begin the responder BRP TXSS a Medium Beamforming Inter-Frame Space (MBIFS) after the initiator BRP TXSS.

24. An apparatus comprising:
   means for causing an initiator station (STA) of a Beam Refinement Protocol (BRP) Transmit (TX) Sector Sweep (TXSS) procedure to transmit a first BRP frame to initiate the BRP TXSS procedure with a responder STA, the first BRP frame comprising an Enhanced Directional Multi-Gigabit (EDMG) BRP request element comprising a TXSS Multiple Input Multiple Output (MIMO) (TXSS-MIMO) field to indicate whether the BRP TXSS procedure is a Single Input Single Output (SISO) BRP TXSS procedure or a MIMO BRP TXSS procedure;
   means for processing a second BRP frame from the responder STA, the second BRP frame in response to the first BRP frame, the second BRP frame to confirm the BRP TXSS procedure; and
   means for causing the initiator STA to, in accordance with the TXSS-MIMO field, perform an initiator BRP TXSS of the SISO BRP TXSS procedure or an initiator BRP TXSS of the MIMO BRP TXSS procedure, wherein the initiator BRP TXSS of the SISO BRP TXSS procedure comprises transmission of one or more EDMG BRP-TX packets to the responder STA via a single transmit chain, wherein the initiator BRP TXSS of the MIMO BRP TXSS procedure comprises transmission of the one or more EDMG BRP-TX packets to the responder STA via multiple transmit chains.

25. The apparatus of claim 24 comprising means for causing the initiator STA to:
   during a responder BRP TXSS of the BRP TXSS procedure, receive one or more EDMG BRP-TX packets from the responder STA; and
   transmit a BRP feedback frame to the responder STA, the BRP feedback frame comprising feedback based on measurements on the one or more EDMG BRP-TX packets from the responder STA.

* * * * *